(12) United States Patent
Komoda et al.

(10) Patent No.: US 6,249,080 B1
(45) Date of Patent: Jun. 19, 2001

(54) FIELD EMISSION ELECTRON SOURCE, METHOD OF PRODUCING THE SAME, AND USE OF THE SAME

(75) Inventors: Takuya Komoda, Sanda; Nobuyoshi Koshida, Kodaira, both of (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/140,647

(22) Filed: Aug. 26, 1998

(30) Foreign Application Priority Data

Oct. 29, 1997 (JP) .................................................. 9-297108
Mar. 16, 1998 (JP) .................................................. 10-065592

(51) Int. Cl.$^7$ ..................................................... H01J 1/02
(52) U.S. Cl. ............................................. 313/310; 445/51
(58) Field of Search ...................... 313/310, 309, 313/336, 351, 495, 496, 497; 257/9, 10, 11, 30, 37, 38, 39; 445/51

(56) References Cited

U.S. PATENT DOCUMENTS

| | | |
|---|---|---|
| 3,665,241 | 5/1972 | Spindt et al. . |
| 5,360,759 * | 11/1994 | Stengl et al. ............................ 437/20 |
| 5,430,300 | 7/1995 | Yue et al. . |
| 5,726,464 * | 3/1998 | Kumomi et al. ..................... 257/103 |

FOREIGN PATENT DOCUMENTS

| | | |
|---|---|---|
| 798761 | 10/1997 | (EP) . |
| 8-250766 | 9/1996 | (JP) . |
| 8250766 | 9/1996 | (JP) . |
| 9-259795 | 10/1997 | (JP) . |

OTHER PUBLICATIONS

Patent Abstracts of Japan, vol. 97, No. 001, Jan. 31, 1997.
English Language Abstract of JP No. 8–250766., Sep. 27, 1996.
English Language Abstract of JP No. 9–259795., Oct. 3, 1997.
Michaelson, Journal of Applied Physics, vol. 48, No. 11, pp. 4729–4733, Nov. 1997, "The Work Function of the Elements and its Periodicity".
Xia Sheng et al., Technical Report of the Institute of Electronics, Information and Communication Engineers, ED96–141, pp. 41–46 (1996–12), "Surface–Emitting Cold Cathode Based on Porous Silicon—Fundamental Characteristics and Emission Mechanism".
Spindt et al., IEEE Transactions on Electron Devices, vol. 38, No. 10, pp. 2355–2363 (1991), Technical Report of the Institute of Electronics, Information and Communication Engineers, ED96–141, pp. 41–46 (1996–12), "Field–Emitter Arrays for Vacuum Microelectronics".

* cited by examiner

Primary Examiner—Nimeshkumar D. Patel
Assistant Examiner—Todd Reed Hopper
(74) Attorney, Agent, or Firm—Greenblum & Bernstein, P.L.C.

(57) ABSTRACT

A field emission electron source comprising an electrically conductive substrate, an oxidized or nitrided porous polysilicon layer formed on the surface of said electrically conductive substrate on one side thereof and having nanostructures and a thin metal film formed on said oxidized or nitrided porous polysilicon layer. Voltage is applied to said thin metal film used as a positive electrode with respect to said electrically conductive substrate thereby to emit electron beam through said thin metal film.

35 Claims, 15 Drawing Sheets

FIELD EMISSION ELECTRON SOURCE, METHOD OF PRODUCING THE SAME, AND USE OF THE SAME

BACKGROUND OF THE INVENTION

1. Field of the Invention

The present invention relates to a field emission electron source for emitting electrons from a surface of a material by applying an electric field of an intensity higher than the work function of the material to the surface of the material and, more particularly, to a field emission electron source comprising electrodes and a semiconductor sandwiched between the two electrodes for emitting electrons by applying a voltage between the electrodes. The present invention also relates to a method of producing the same, and the use of the same.

2. Description of the Related Art

As field emission electron sources, those using the so-called Spindt type electrode such as disclosed in, for example, U.S. Pat. No. 3,665,241 are well known. The Spindt type electrode comprises a substrate having a multitude of minute emitter chips of a triangular pyramid shape disposed thereon and gate layers that have emission holes through which tips of the emitter chips are exposed and are insulated from the emitter chips. In this structure, a high voltage is applied in a vacuum atmosphere to the emitter chips as negative electrode with respect to the gate layer, electron beams can be emitted from the tips of the emitter chips through the emission holes.

However, the production process of the Spindt type electrode is complicated and it is difficult to make a multitude of emitter chips of a triangular pyramid shape with high accuracy and, hence difficult to make a device of large emission area when applying this technology to, for example, a planar light emitting apparatus or a display apparatus. Also with the Spindt type electrode, since the electric field is concentrated on the tip of the emitter chip, emitted electrons ionize various residual gases into positive ions where the degree of vacuum is low and the residual gas exists in the vicinity of the tips of the emitter chips. Therefore, the positive ions impinge on the tips of the emitter chips and eventually damage the tips of the emitter chips, resulting in such problems that the current density and efficiency of the emitted electrons become unstable and the service life of the emitter chips decreases. Thus, the Spindt type electrode has such a drawback that the atmosphere in which it is used must be pumped to a high degree of vacuum ($10^{-5}$ Pa to $10^{-6}$ Pa) in order to avoid the problems described above, resulting in higher cost and difficult handling.

In order to overcome the drawback described above, field emission electron sources of MIM (Metal Insulator Metal) type and MOS (Metal Oxide Semiconductor) type have been proposed. The former is a field emission electron source of a planar configuration having a laminated structure of metal-insulation film-metal and the latter is one of a metal-oxide film-semiconductor structure. However, it is necessary to reduce the thickness of the insulation film or the oxide film in order to improve the electron emitting efficiency to thereby increase the number of electrons emitted with these types of field emission electron sources, while making the insulation film or the oxide film too thin may lead to dielectric breakdown when a voltage is applied between the upper and lower electrodes of the laminated structure described above. Thus there has been such a problem that, in order to avoid the dielectric breakdown of the insulator film, the electron emitting efficiency (pullout efficiency) cannot be made too high because there is a limitation on the reduction of the thickness of the insulation film or the oxide film.

A different field emission electron source has recently been proposed in Japanese Patent Kokai Publication No. 8-250766. According to this publication, the field emission electron source is made by using a single-crystal semiconductor substrate such as a silicon substrate, forming a porous semiconductor layer (a porous silicon layer, for example) by anodization of one surface of the semiconductor substrate, and forming a thin metal film on the porous semiconductor layer. A voltage is adapted to be applied between the semiconductor substrate and the thin metal film to cause the field emission electron source to emit electrons.

A display apparatus having the field emission electron source described above is also disclosed in Japanese Patent Kokai Publication No. 9-259795. In this case, when the silicon layer is made up of single-crystal, it is desirable that (100) direction is at right angle to a surface to enhance the efficiency of electron emission, because it is supposed that (100) porous silicon layer has holes of a diameter in the order of nano-meter and silicon crystal, which are arranged at right angle to the surface.

However, in the structure disclosed in Japanese Patent Kokai Publication No. 8-250766, since the substrate used therein uses a semiconductor substrate, it is difficult to produce the device with a large area and to reduce the cost thereof.

In any event, both of the structure disclosed in Japanese Patent Kokai Publication No. 8-250766 and the structure disclosed in Japanese Patent Kokai Publication No. 9-259795, involve the so-called popping phenomenon during electron emission that leads to unevenness in the amount of electrons emitted, and therefore causes unevenness in the light emission when the field emission electron sources are applied to a planar light emitting apparatus or a display apparatus.

SUMMARY OF THE INVENTION

Under these circumstances, the present invention has been accomplished. That is, a first object of the present invention is to provide a field emission electron source capable of achieving a stable emission of electrons with high efficiency by suppressing the popping phenomenon.

A second object of the present invention is to provide the use of the field emission electron source in, for example, a planar light emitting apparatus, a display apparatus and a solid vacuum device, all being of a kind capable of emitting light uniformly. In order to achieve the above objects, the inventors studied wholeheartedly the field emission electron source and found out that thermal insulating characteristics are high because the silicon layer is made up of single-crystal and a whole semiconductor substrate is made porous, in the structures disclosed in Japanese Patent Kokai Publications No. 8-250766 and No. 9-259795. The inventors also found out that the temperature of the semiconductor substrate rises when voltage is applied between the semiconductor substrate and the thin metal film. Further the inventors found out that electrons are thermally excited and electrical resistivity of the semiconductor substrate decreases when the temperature of the semiconductor substrate is increased, accompanied by increase of the amount of electrons emitted. Therefore, these structures are susceptible to the popping phenomenon during electron emission leading to unevenness in amount of electrons emitted.

Based on above findings, according to one aspect of the present invention there is provided a field emission electron source comprising an electrically conductive substrate, an oxidized or nitrided porous polysilicon layer formed on the surface of said electrically conductive substrate on one side thereof and having nano-structures and a thin metal film formed on the oxidized or nitrided porous polysilicon layer, wherein a voltage is applied to the thin metal film used as a positive electrode with respect to the electrically conductive substrate thereby to emit electron beam through the thin metal film.

In the present invention, the electrically conductive substrate forms a negative electrode of the field emission electron source and has strength enough to support porous polysilicon layer in vacuum. When voltage is applied to the electrically conductive substrate, the electrons are injected to the porous polysilicon layer. The electrically conductive substrate may be metal substrate such as chrome substrate or semiconductor substrate such as single crystal silicon substrate as long as the electrically conductive substrate can form the negative electrode. Also the electrically conductive substrate may be a combination of a substrate such as glass substrate and an electrically conductive thin film formed on the surface of the substrate. In this case, this structure makes it possible to produce the field emission electron source having a larger emission area at a lower cost than that where semiconductor substrates such as single crystal silicon substrate are used for the electrically conductive substrate.

In the present invention the electrons are injected into the porous polysilicon layer when voltage is applied between the conductive substrate and the thin metal film. The porous polysilicon layer is polycrystal having grains There are nano-structures having oxidized or nitrided coating thereon on the surface of the grains. The size of the nano-structures is smaller than approximately 50 nm, which is in the same order of the mean free path of electrons in the single crystal silicon, so that the electrons injected to the porous polysilicon layer reach the surface of the porous polysilicon layer with suspected ballistic effect and less scattering of electrons. The suspected ballistic effect is the effect that electrons skip the nano-structures without collisions. Concretely, the size of the nano-structures need to be smaller than 10 nm, and preferably smaller than 5 nm.

It is preferred that the porous polysilicon layer is a polysilicon layer that makes the field emission electron source have substantially no popping phenomenon when voltage is applied to the thin metal film used as a positive electrode with respect to the electrically conductive substrate thereby to emit electron beam through the thin metal film. The porous polysilicon layer may be made by alternately laminating a polysilicon layer having high porosity and a polysilicon layer having a low porosity.

Also the porous polysilicon layer may be a layer whose porosity changes continuously in the direction of thickness. In this case, the porous polysilicon layer may be a layer whose porosity changes continuously in a direction of thickness so that said porosity is higher on a side of the electrically conductive substrate than on a front surface side.

It is also preferred that the polysilicon layer is an undoped polysilicon layer. In this case, efficiency of electron emission is higher and productivity of the polysilicon layer is higher than in the case of the doped polysilicon layer.

The thin metal film forms a positive electrode of the field emission electron source, and is for applying voltage to the porous polysilicon layer. Electrons reaching the surface of the porous polysilicon layer emit from a surface of the thin metal film due to quantum tunneling effect by applying the electric field. The smaller the work function of the thin metal film is, the more preferable it is, since ideal energy of the emitted electron is equivalent to the work function of the thin metal film less the electron energy produced by applying DC voltage between the conductive substrate and the thin metal film.

In the present invention described above, when the field emission electron source is housed in a vacuum chamber and a collector electrode is disposed at a position so as to confront the thin metal film, and a DC voltage is applied with the thin metal film at a positive polarity with respect to the conductive substrate, and a DC voltage is applied with the collector electrode at a positive polarity with respect to the thin metal film, electrons emit from a surface of the thin metal film. And it is made possible to achieve stable electron emission with high efficiency.

In another aspect of the present invention, there is provided a method of producing the field emission electron source which comprises forming a polysilicon layer on an electrically conductive substrate, making the polysilicon layer porous, oxidizing or nitriding the porous polysilicon layer and forming an electrode made of a thin metal film on the oxidized or nitrided porous polysilicon layer.

Where the conductive substrate is a semiconductor substrate, the polysilicon layer is formed on the conductive substrate by the use of LPCVD (Low Pressure Chemical Vapor Deposition) process, sputtering process or so on. Also the polysilicon layer may be formed by annealing an amorphous silicon layer formed on a conductive substrate by plasma-CVD process. Preferably, the polysilicon layer is formed by the use of LPCVD process. Conditions of the LPCVD process include, for example, a vacuum of 20 Pa, a temperature of 640° C., and a silane gas floating at 600 sccm.

Where the conductive substrate is the combination of the glass substrate and the conductive thin film, a polysilicon layer is formed on the conductive thin film by annealing with an excimer laser to an amorphous silicon layer formed on the conductive thin film by CVD process. It is not limited to these processes, the polysilicon layer may be formed by CGS (Continuous Grain Silicon) process, catalytic CVD process, or so on.

The porous polysilicon layer is formed by a process that forms nano-structures, such as anodization. The porous polysilicon layer is oxidized or nitrided by the use of rapid thermal oxidation, chemical oxidation, oxygen plasma oxidation, nitrogen plasma nitriding, thermal nitriding, or so on.

The metal thin film is formed on the porous polysilicon layer by the use of evaporation, sputtering process, or so on.

In this case, the porous polysilicon layer may be formed by making the polysilicon layer porous so that a polysilicon layer having a high porosity and a polysilicon layer having a low porosity are laminated alternately. Also, the porous polysilicon layer may be formed by making the polysilicon layer porous so as to have a porosity higher on the side of the electrically conductive substrate than on the front surface side with the porosity changing continuously in the direction of thickness. In a further aspect of the present invention, there is provided a planar light emitting apparatus which comprises a field emission electron source comprising an electrically conductive substrate, an oxidized or nitrided porous polysilicon layer formed on the surface of said electrically conductive substrate on one side thereof and having nano-structures and a thin metal film formed on the oxidized or nitrided porous polysilicon layer and a transparent electrode disposed to oppose said thin metal film. The transparent electrode has a fluorescent substance which emits visible light when irradiated with electron beam being provided thereon. The directions of electron emission from the field emission electron source are aligned substantially at right angles to the surface of the thin metal film, thus making it possible to produce a thin planar light emitting apparatus of a simpler structure without need to use a convergence electrode.

In a further aspect of the present invention, there is provided a display apparatus which comprises a field emission electron source comprising an electrically conductive substrate, an oxidized or nitrided porous polysilicon layer formed on the surface of the electrically conductive substrate on one side thereof and having nano-structures and a thin metal film formed on the oxidized or nitrided porous polysiliwn layer. The field emission electron source is formed in matrix configuration. A controller for controlling voltages applied to said field emission electron sources and a transparent electrode disposed to oppose said thin metal film are also employed. The transparent electrode has a fluorescent substance which emits visible light when irradiated with electron beam being provided thereon. Thus the directions of electron emission from the field emission electron source are aligned substantially at right angles to the surface of the thin metal film, and therefore it is possible to achieve a display apparatus of high definition without need to use a complicated shadow mask and an electron convergence lens.

In a further aspect of the present invention, there is provided a solid vacuum device which comprises a field emission electron source comprising an electrically conductive substrate, an oxidized or nitrided porous polysilicon layer formed on the surface of the electrically conductive substrate on one side thereof and having nano-structures and a thin metal film formed on the oxidized or nitrided porous polysilicon layer, a positive electrode and a vacuum chamber. Both of the field emission electron source and said positive electrode are disposed in said vacuum chamber. Since the field emission electron source constitutes a cold cathode, it is not necessary to install a heating means unlike a solid vacuum device of the prior art having a hot cathode which utilizes thermionic electron emission, thus maling it possible to make the apparatus smaller and also to suppress evaporation and degradation of cathode material, thereby achieving a solid vacuum device of longer service life.

BRIEF DESCRIPTION OF THE DRAWINGS

These and other objects and features of the present invention will become clear from the following description taken in conjunction with the preferred embodiments thereof and the accompanying drawings throughout which like parts are designated by like reference numerals, and in which:

FIG. 6A shows energy band before applying DC voltage Vps;

FIG. 6B shows energy band after applying DC voltage Vps;

DETAILED DESCRIPTION OF THE PREFERRED EMBODIMENTS

This application is based on patent applications No. HEI-9-297108 and HEI-10-065592 filed in Japan, the contents of which are incorporated herein by reference.

(First Embodiment)

Figure 1:
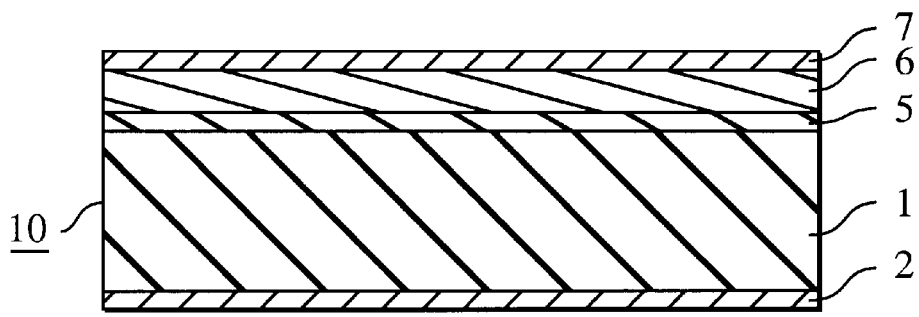
FIG. 1 is a cross sectional view showing a field emission electron source of a first embodiment.

FIG. 1 is a schematic diagram showing the configuration of a field emission electron source 10 according to this embodiment, and FIGS. 2A to 2D are cross sectional views of major steps of producing the field emission electron source 10. In this embodiment, an n-type silicon substrate 1 ((100)-substrate having a resistivity of about 0.1 Ωcm) is used for an electrically conductive substrate.

As shown in FIG. 1, the field emission electron source 10 according to this embodiment includes an n-type silicon substrate 1, an ohmic electrode 2, a polysilicon layer 5, a porous polysilicon layer 6 oxidized by the rapid thermal oxidation technique and a thin gold film 7 as a thin metal film.

The n-type silicon substrate 1 and the ohmic electrode 2 form the conductive substrate. The polysilicon layer 5 is formed on the n-type silicon substrate 1, and the porous polysilicon layer 6 is formed on the polysilicon layer 5. Incidentally, oxidation employed to form the layers 5 and 6 is not limited to rapid thermal oxidation, and chemical oxidation or nitriding can be used.

The porous polysilicon layer 6 oxidized by the rapid thermal oxidation has many grains having nano-structures. The nano-structures have a size smaller than approximately 50 nm, which is in the same order of the mean free path of electron in the single crystal silicon. Specifically, the size of the nano-structures need to be smaller than 10 nm, and preferably smaller than 5 nm.

The gold thin film 7 is formed on the porous polysilicon layer 6, and the gold thin film 7 is a thin film made of gold whose work function is small. Incidentally, the thin metal film is not limited to the gold thin film 7, and may be prepared from any suitable material as far as the work function of such suitable material is small. Aluminum, chrome, tungsten, nickel, platinum can be used therefor. The work function of aluminum is 4.28 eV, that of chrome is 4.50 eV, that of tungsten is 4.55 eV, that of nickel is 5.15 eV, that of platinum is 5.65 eV, and that of gold is 5.10 eV, according to "Journal of Applied physics, vol. 48 (1977) p 4729—(H. B. Michaelson)".

A method of making the field emission source 10 of the structure described above will be described below with reference to FIGS. 2A to 2D.

Figure 2A:
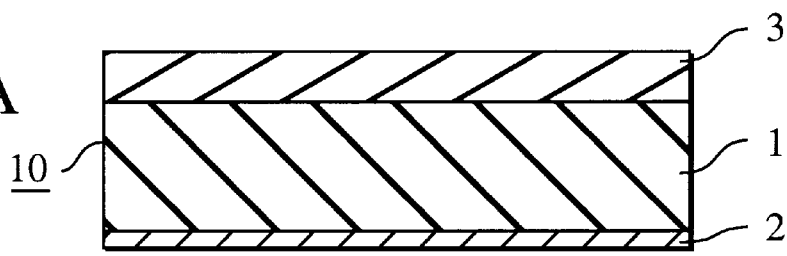
FIGS. 2A to 2D are cross sectional views showing major steps for explaining the production process of the field emission electron source.
Figure 2B:
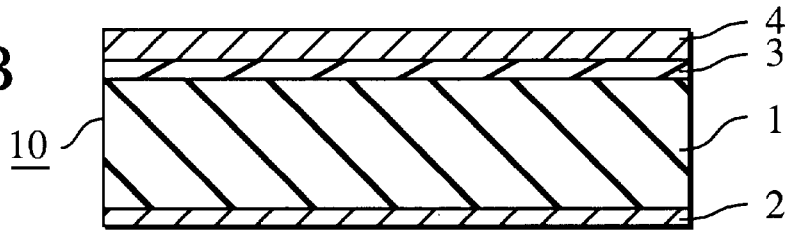

First the ohmic electrode 2 is formed on a back surface of the n-type silicon substrate 1, and then an undoped polysilicon layer 3 of about 1.5 μm in thickness is formed on a front surface of the n-type silicon substrate 1 opposite to the back surface, thereby to obtain a structure as shown in FIG. 2A. The polysilicon layer 3 is formed by the use of LPCVD process, using a vacuum of 20 Pa, a temperature of 640° C., and a floating silane gas at 600 sccm. Then, the polysilicon layer 3 is subjected to anodization or anodization with a constant current while being irradiated with light. During this anodization, a liquid electrolyte made by mixing a 55 wt % aqueous solution of hydrogen fluoride and ethanol in a proportion of about 1:1 is used and a platinum electrode (not shown) is used as a negative electrode and the n-type silicon substrate 1 (ohmic electrode 2) is used as positive electrode. By this anodization, a porous polysilicon layer 4 (hereinafter referred to as PPS layer 4) can be obtained as shown in FIG. 2B. In this embodiment, the anodization process was conducted under conditions of a constant current density of 10 mA/cm$^2$ and duration of anodization being 30 seconds, while irradiating the surface of the polysilicon layer 3 with light by means of a 500 W tungsten lamp during the process of anodization. As a result, the porous polysilicon layer 4 of about 1 μm in thickness was formed in this embodiment. While a part of the polysilicon layer 3 is made porous in this embodiment, the entire polysilicon layer 3 may be made porous.

Figure 2C:
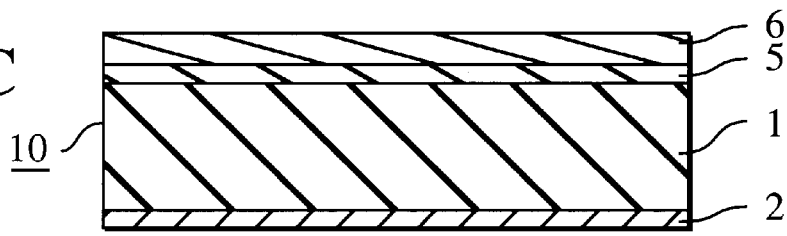

Then, by subjecting the structure of FIG. 2B, i.e., by effecting the rapid thermal oxidization (RTO) to the PPS layer 4, a structure shown in FIG. 2C is obtained. Reference numeral 5 in FIG. 2C denotes a part of the polysilicon layer and reference numeral 6 denotes a part of the PPS layer processed by the rapid thermal oxidation (hereinafter referred to as RTO-PPS layer 6). The rapid thermal oxidation process was conducted at an oxidation temperature of 900° C. for the oxidation period of one hour. In this embodiment, since the PPS layer 4 is oxidized by the rapid thermal oxidation, the layers can be heated up to the oxidation temperature in several seconds, thus making it possible to suppress entrainment oxidation taking place when charging into a furnace in case the conventional oxidation apparatus of furnace tube type is used.

Figure 2D:
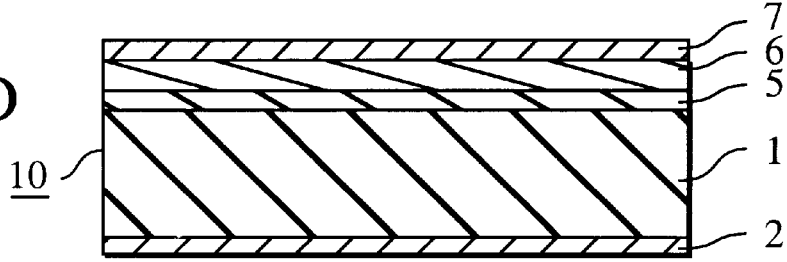

Then the thin gold film 7 is formed on the RTO-PPS layer 6 by, for example, evaporation, thereby to obtain the field emission electron source 10 having a structure shown in FIGS. 1 and 2D. While the thickness of the thin gold film 7 is about 10 nm in this embodiment, the thickness is not limited to a particular value. The field emission electron source 10 forms a diode with the thin gold film 7 serving as a positive electrode (anode) and the ohmic electrode 2 serving as a negative electrode (cathode).

Now characteristics of the field emission electron source 10 of this embodiment will be described below.

Figure 3:
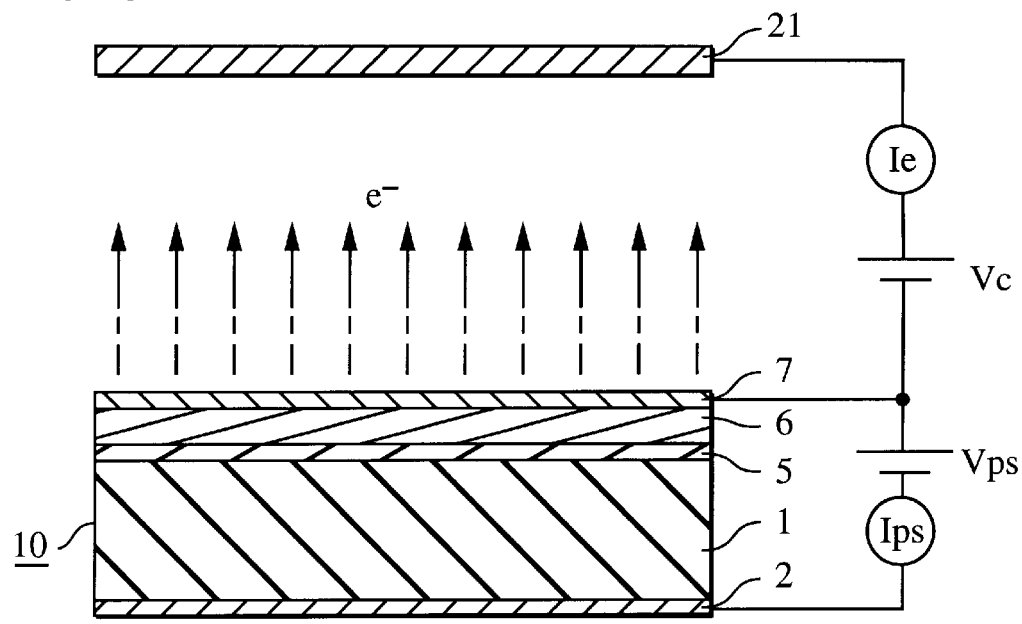
FIG. 3 is a schematic diagram for explaining the measuring principle of emitted electrons of the field emission electron source.

The field emission electron source 10 is housed in a vacuum chamber (not shown) and a collector electrode 21 (collector for emitted electrons) is disposed at a position so as to confront the thin gold film 7 as shown in FIG. 3. The inside of the vacuum chamber is evacuated to a degree of about 5×10$^{-5}$ Pa. A DC voltage Vps is applied with the thin gold film 7 at a positive polarity with respect to the ohmic electrode 2 (i.e. n-type silicon substrate 1), and a DC voltage Vc is applied with the collector electrode 21 at a positive polarity with respect to the thin gold film 7. Measurements of the diode current Ips flowing between the thin gold film 7 and the ohmic electrode 2, and the electron emission current Ie flowing between the collector electrode 21 and the thin gold film 7 due to the emission of electrons e$^-$ from the field emission electron source 10 through the thin gold film 7 (alternate dash and dot line in FIG. 3 represents the emitted electron current) are shown in FIG. 4.

Figure 4:
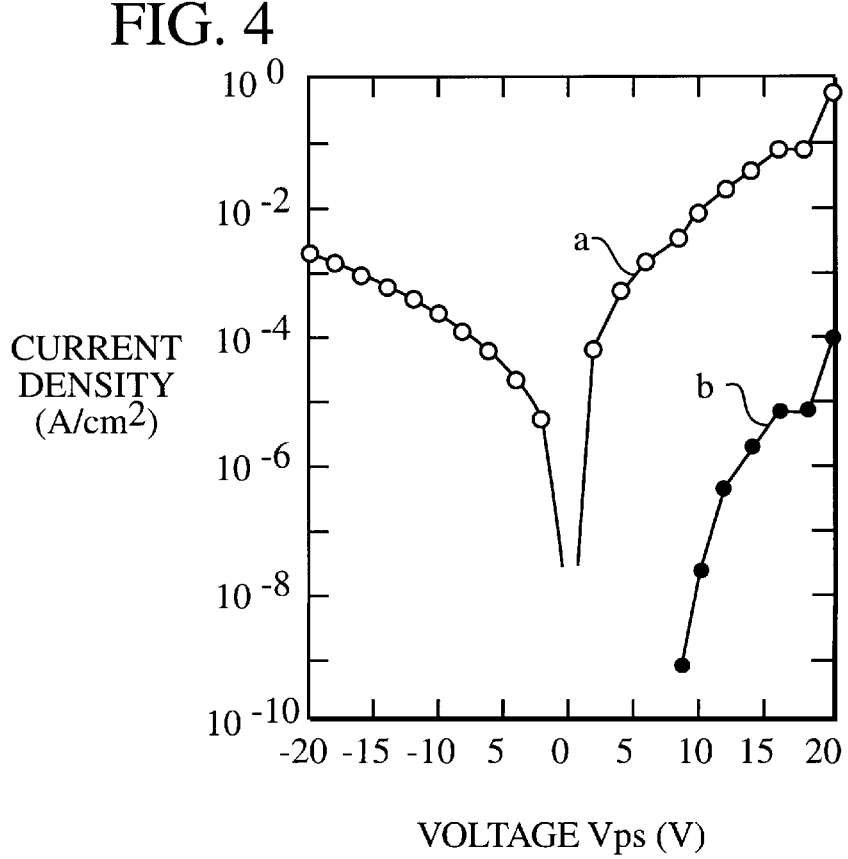
FIG. 4 is a graph showing a voltage-current characteristic of the field emission electron source.

In FIG. 4, the DC voltage Vps is plotted along the horizontal axis and the current density is plotted along the vertical axis. Curve a in the drawing represents the diode current Ips and curve b represents the electron emission current Ie. The DC voltage Vc is set constant at 100 V.

As will be seen from FIG. 4, the electron emission current Ie was observed only when the DC voltage Vps was positive, while both the diode current Ips and the electron emission current Ie were increased as the DC voltage Vps was increased. Specifically, when the DC voltage Vps was 15 V, current density of the diode current Ips was about 100 mA/cm$^2$ and the current density of the electron emission current Ie was about 10 μA/cm$^2$. This value of the electron emission current Ie is greater than that obtained with a field emission electron source prepared by making the surface of a single crystal silicon substrate porous, described previously in conjunction with the prior art such as, for example, disclosed in JP Unexamined Publication No. 8-250766. According to the "Electronic Information & Telecommunications Association ED96-141, pp41–46", they described about 40 mA/cm$^2$ for the current density of the diode current Ips and 1 μA/cm$^2$ for the current density of the electron emission current Ie when the DC voltage Vps was 15 V. Thus, this embodiment of the present invention is effective to provide the field emission electron source exhibiting a high efficiency of electron emission.

Figure 5:
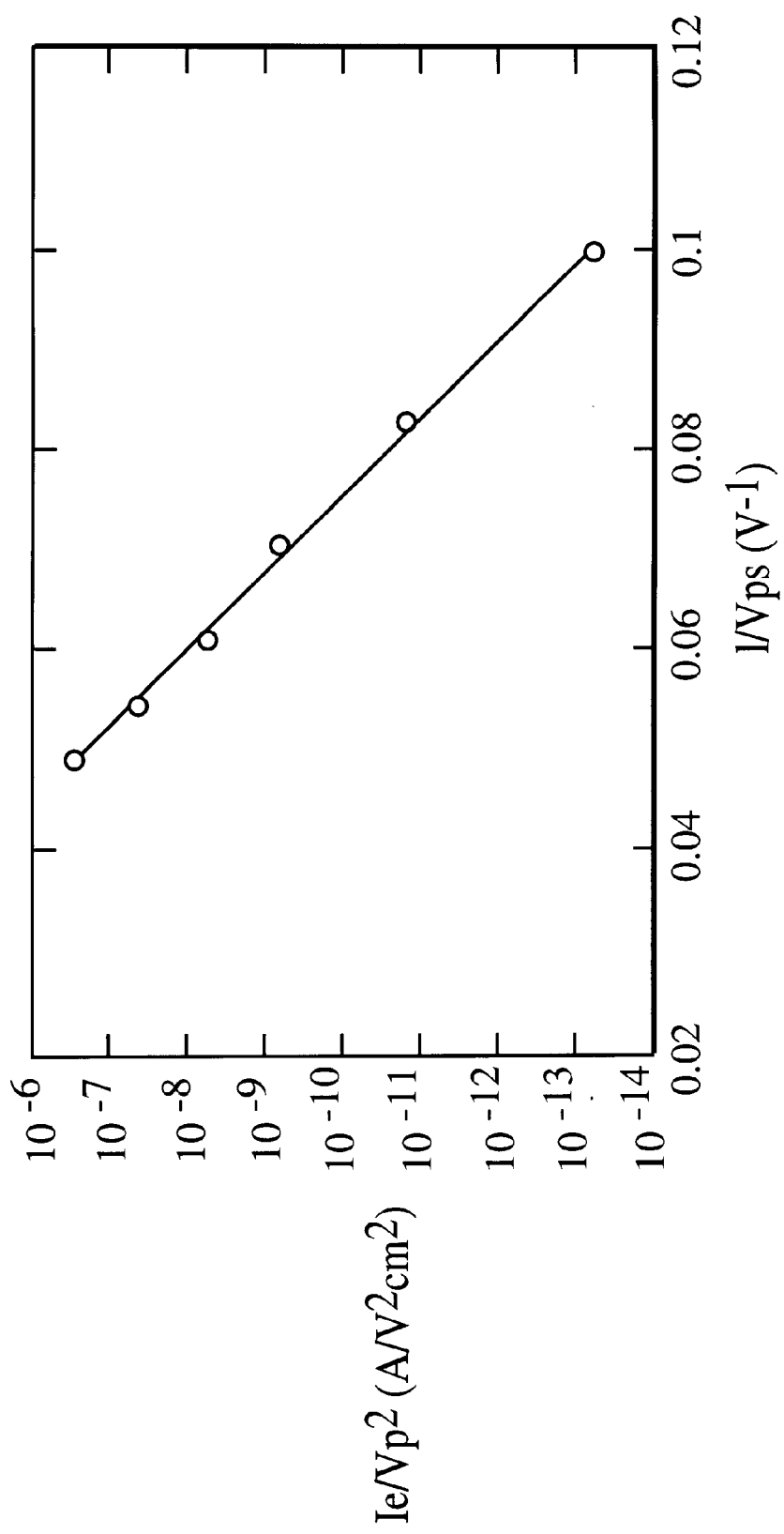
FIG. 5 is a graph of Fowler-Nordheim plot of the data of FIG. 4.
Figure 6A:
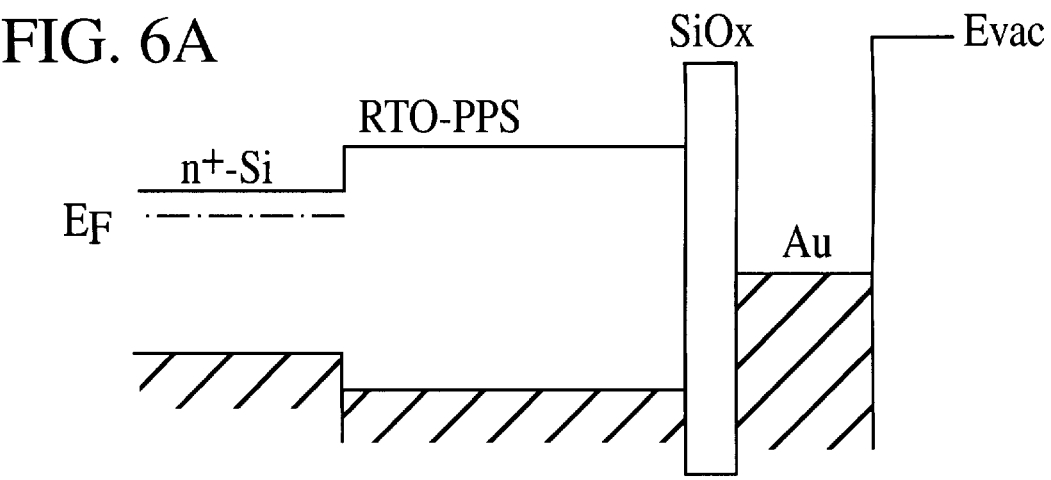
FIG. 6A is an energy band diagram showing the above electron emitting mechanism.
Figure 6B:
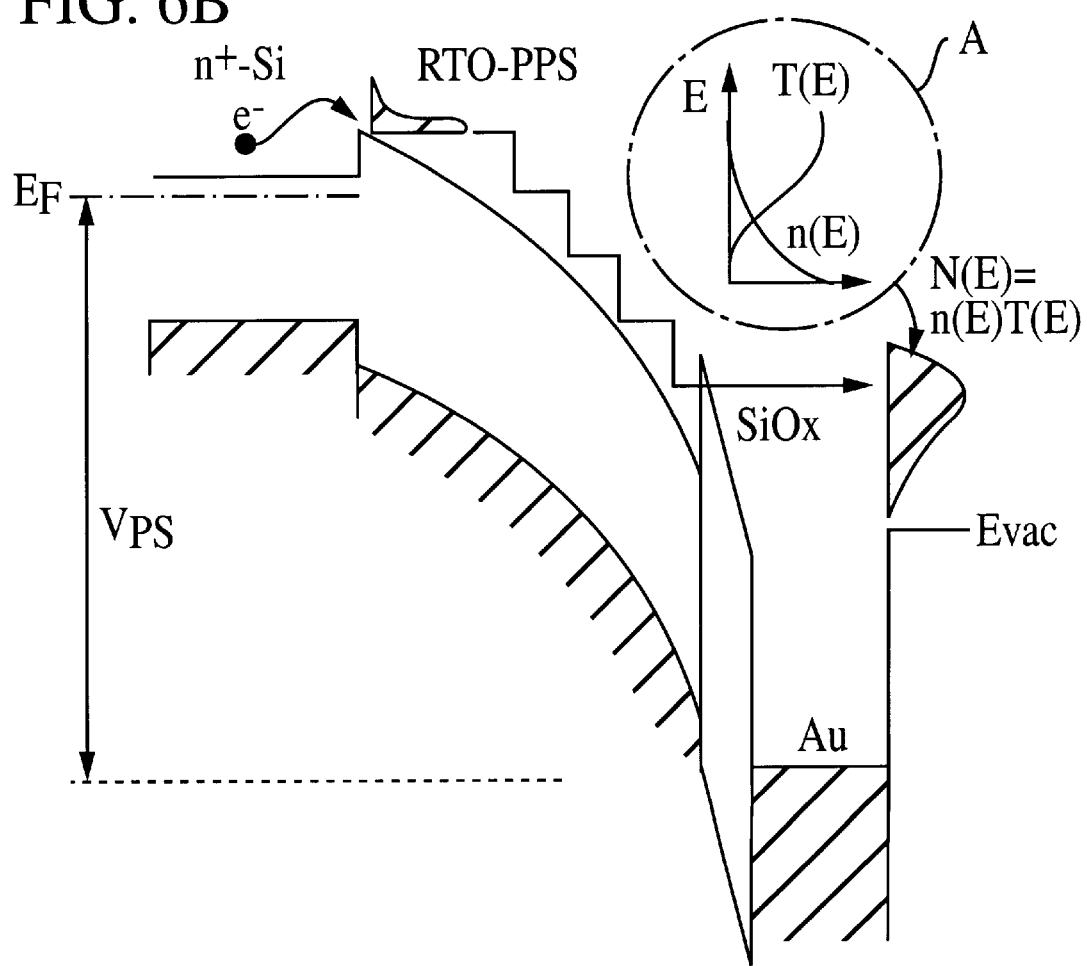
FIG. 6B is an energy band diagram showing the above electron emitting mechanism.

FIG. 5 shows Fowler-Nordheim plots of the electron emission current versus DC voltage Vps. The fact that the plots lie on a straight line indicates that the electron emission current Ie caused by the emission of electrons is due to the well-known quantum tunneling effect. Mechanism of the electron emission will be described below with reference to an energy band diagram of FIGS. 6A and 6B. In FIGS. 6A and 6B, reference character n$^+$-Si represents the n-type silicon substrate 1, reference character RTO-PPS represents the RTO-PPS layer 6, reference character SiOx represents a thin oxidized silicon film formed on the top surface of the RTO-PPS layer 6, reference character Au represents the thin gold film 7, reference character $E_F$ represents the Fermi level and reference character $E_{VAC}$ represents the vacuum level. FIG. 6A shows the state before the DC voltage Vps is applied and FIG. 6B shows the state with the DC voltage Vps being applied. When the DC voltage Vps, applied to the thin gold film 7 which is of a positive polarity with respect to the n-type silicon substrate 1, reaches a predetermined threshold value, electrons e- are injected from the n-type type silicon substrate 1 into the RTO-PPS layer 6 by thermal excitation as shown in FIG. 6B. At this time, since most of the DC voltage Vps is applied across the semi-insulating RTO-PPS layer 6, the injected electrons e$^-$ are caused to drift due to a strong electric field of, for example, about $10^5$ V/cm in average field intensity generated in the RTO-PPS layer 6, and migrate toward the surface while losing kinetic energy due to scattering by irregular potential and lattice (Electron multiplication due to impact ionization may take place in this process). The electrons e⁻ which have reached the surface of the RTO-PPS layer 6 are supposed to be so-called hot electrons having higher kinetic energy than that in the state of thermal equilibrium, and are supposed to easily penetrate the thin gold film 7 through the sub-band of SiOx at the top surface of the RTO-PPS layer 6 due to tunneling by the electric field effect, thereby to be enitted to the outside.

Figure 7:
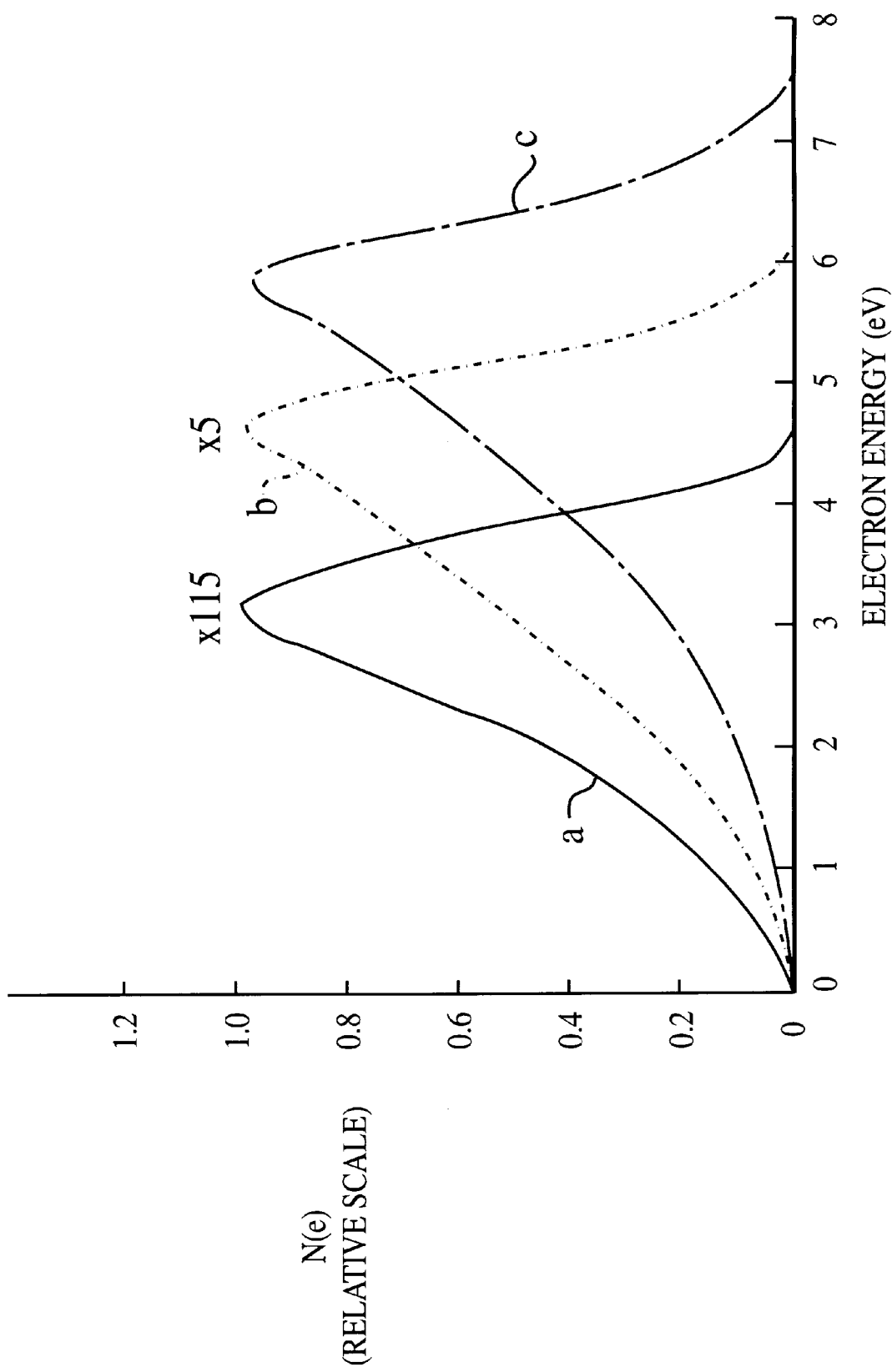
FIG. 7 is a schematic diagram for explaining the energy distribution of the above emitted electrons.

In order to verify this hypothesis, distribution of energy N(E) of electrons emitted from the field emission electron source of this embodiment was measured, and the result is shown in FIG. 7. In FIG. 7, curve a shows the distribution when the DC voltage Vps is 12 V, curve b shows the distribution when the DC voltage Vps is 15 V and curve c shows the distribution when the DC voltage Vps is 18 V. From FIG. 7, it is found that the distribution of energy n(E) of electrons is relatively broad and, moreover, includes high-energy components of several electron volts, while the peak energy shifts toward higher energy as the DC voltage Vps applied increases. Therefore it is supposed that there occurs less scattering of electrons in the RTO-PPS layer 6, and that the electrons e⁻ which have reached the surface of the RTO-PPS layer 6 are hot electrons having sufficient energy. The graph shown in the chain-lined circle A in FIG. 6B shows the qualitative relationship between the energy distribution n(E) of electrons immediately before emission and the probability of tunneling emission T(E), wherein a profile of the energy distribution N(E) of the emitted electrons is determined by the product of n(E) and T(E) (N(E)= n(E) T(E)). When the DC voltage Vps increases, for example, n(E) changes so that the components in the high-energy tail increase and, as a result, N(E) shifts toward higher energy as a whole.

Figure 8:
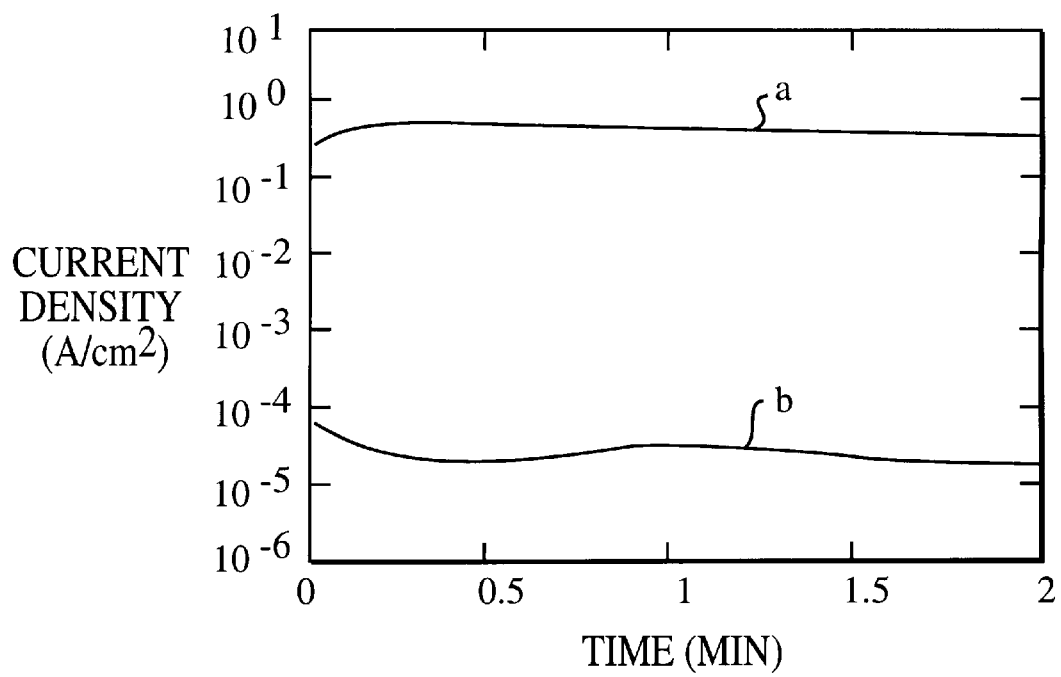
FIG. 8 is a graph showing a change in current with time.

The fact that the electrons are not subject to such a strong scattering that causes relaxation to thermal equilibrium meansless energy loss, i.e. thermal loss, in the RTO-PSS layer 6 so that a high efficiency of electron emission current Ie and stable emission of electrons are achieved. FIG. 8 is a graph showing the diode current Ips and the electron emission current Ie of the field emission electron source 10 of this embodiment with change in time. Time is plotted along the horizontal axis and the current density is plotted along the vertical axis, while curve a shows the diode current Ips and curve b shows the electron emission current Ie. Shown in FIG. 8 is the result obtained by setting the DC voltage Vps constant at 15 V and the DC voltage Vc constant at 100 V. As will be seen from FIG. 8, no popping phenomenon is observed in both the diode current Ips and the electron emission current Ie with the field emission electron source 10 of this embodiment, so that the diode current Ips and the electron emission current Ie can be maintained substantially constant with time. Because it is supposed that the surface of the grains is made porous but the core of the grains retains a crystal state, it is also supposed that heat generated by applying voltage transmits along the crystal and radiates to the outside. Therefore temperature rise of the RTO-PPS layer 6 is smaller than that of single crystal silicon layer. Such a characteristic of stable electron emission current Ie with less chronic change achieved by employing the configuration of the present invention cannot be achieved with the conventional field emission electron source based on the MIM system or single-crystal silicon substrate of which surface is made porous.

Figure 9:
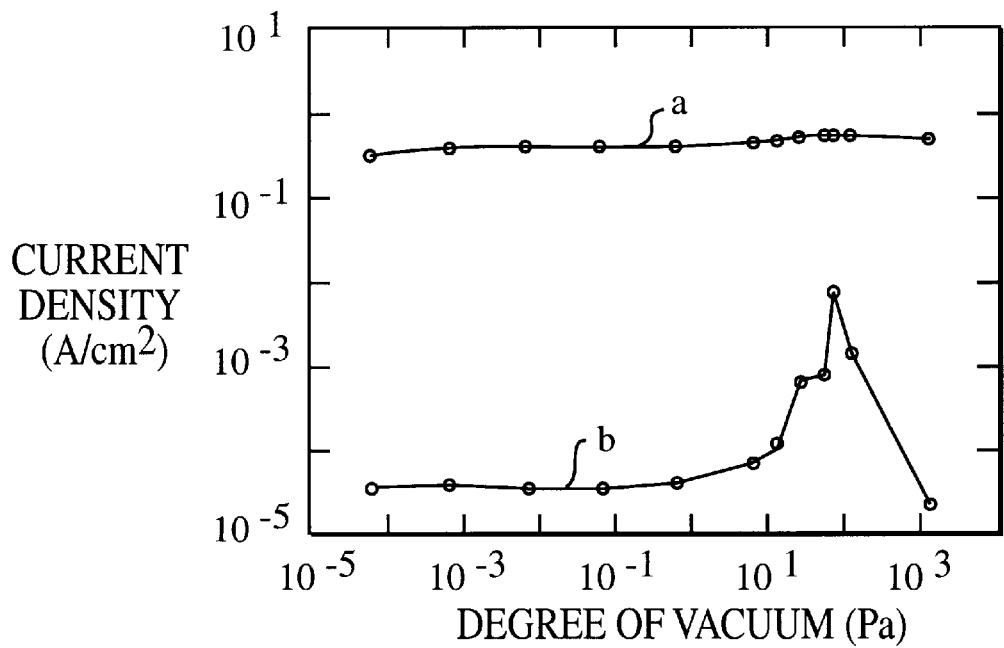
FIG. 9 is a graph showing dependency of the current on the degree of vacuum.

Now the dependency on the degree of vacuum of the electron emission current Ie of the field emission electron source 10 of this embodiment will be described below. FIG. 9 shows the diode current Ips and the electron emission current Ie changing as a function of the degree of vacuum of the argon atmosphere which surrounds the field emission electron source 10 of this embodiment. In FIG. 9, the degree of vacuum is plotted along the horizontal axis and the current density is plotted along the vertical axis. Curve a in the drawing represents the diode current Ips and curve b represents the electron emission current Ie. FIG. 9 shows that a substantially constant electron emission current Ie can be obtained in a range of degrees of vacuum from $10^{-5}$ Pa to about 1 Pa, indicating an insignificant dependence of the electron emission current Ie on the degree of vacuum. Thus, because of the low dependency on the degree of vacuum of the electron emission current Ie of the field emission electron source 10 of this embodiment, stable emission of electrons of high efficiency can be maintained even when the degree of vacuum changes to some extent. Thus, because the satisfactory electron emission characteristic can be achieved even with a low degree of vacuum, it is not necessary to use the field emission electron source under a high degree of vacuum, and it is made possible to produce an apparatus which uses the field emission electron source 10 at a lower cost with handling thereof made easier.

While the n-type silicon substrate 1 ((100) substrate having a resistivity of about 0.1 Ωcm) is used for the electrically conductive substrate in this embodiment, the electrically conductive substrate is not limited to the n-type silicon substrate and, for example, a metal substrate or a glass substrate with a conductive thin film such as an electrically conductive transparent thin film of, for example, indium tin oxide (ITO), platinum or chromium formed thereon may be used, in which case it is made possible to achieve larger emission area and lower production cost than in the case of using a semiconductor substrate such as n-type silicon substrate.

(Second Embodiment)

The basic configuration of the field emission electron source 10 of the second embodiment is substantially similar to that of the first embodiment shown in FIG. 1, and therefore, only the production method will be described below with reference to FIGS. 10A to 10C and FIGS. 11A to 11C. In describing the production method, only the difference from the first embodiment are only described for the sake of brevity. While the porous polysilicon layer is a single layer in the first embodiment, the porous polysilicon layer 6 in this second embodiment is made by alternately laminating a polysilicon layer having a high porosity and a polysilicon layer having a low porosity. This embodiment also uses the n-type silicon substrate 1 ((100) substrate having a resistivity of about 0.1 Ωcm) for the electrically conductive substrate as is the case with that in the first embodiment.

Figure 10A:
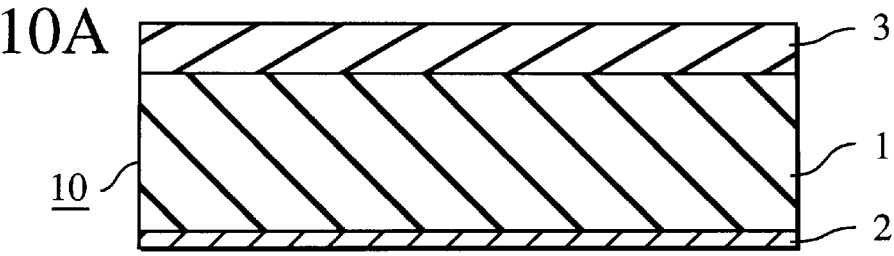
FIGS. 10A to 10C are cross sectional views showing major steps for explaining the production process of a second embodiment.

First the ohmic electrode 2 is formed on the back surface of the n-type silicon substrate 1, and then the undoped polysilicon layer 3 of about 1.5 μm in thickness is formed on the front surface of the n-type silicon substrate 1, thereby to obtain the structure as shown in FIG. 10A.

Then, the polysilicon layer 3 is subjected to anodization with a constant current while being irradiated with light, by using a liquid electrolyte made by mixing a 55 wt % aqueous solution of hydrogen fluoride and ethanol with a proportion of about 1:1, a platinum electrode (not shown) as the negative electrode and the n-type silicon substrate 1 (ohmic electrode 2) as the positive electrode.

Figure 10B:
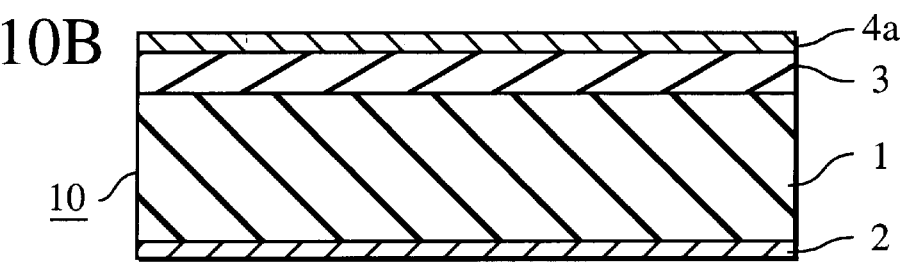

The anodization process was conducted in the following conditions. with constant current density of 2.5 mA/cm$^2$ and duration of anodization of 4 seconds being set for first condition, and constant current density of 20 mA/cm$^2$ and duration of anodization of 5 seconds being set for second condition, anodization under the first condition and anodization under the second condition were repeated alternately, three times each. The surface was irradiated with light by means of a 500 W tungsten lamp during the process of anodization. At the time when anodization under the first condition was completed, a porous polysilicon layer 4a (hereinafter referred to as PPS layer 4a) having a low porosity was formed on the surface of the polysilicon layer 3, resulting in such a structure as shown in FIG. 10B.

Figure 10C:
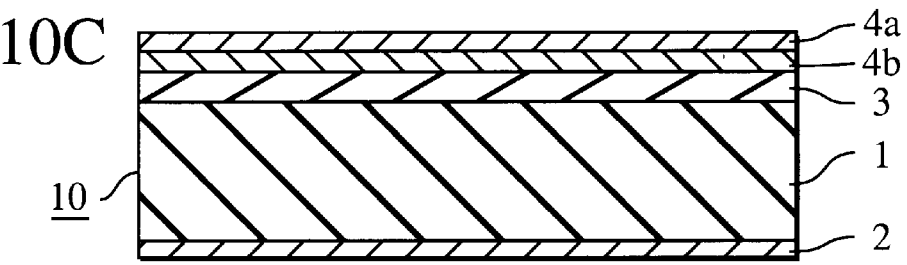
Figure 11A:
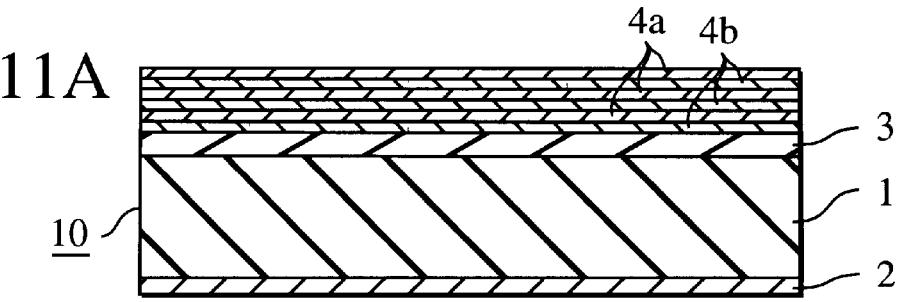
FIGS. 11A to 11C are cross sectional views showing major steps for explaining the production process of the second embodiment.

Then at the time when anodization under the second condition was completed, a porous polysilicon layer 4b (hereinafter referred to as PPS layer 4b) having a higher porosity than that of the PPS layer 4a was formed on one side of the polysilicon layer 4a adjacent the n-type silicon substrate 1, resulting in such a structure as shown in FIG. 10C. When anodization under the first condition and anodization under the second condition, each performed three times, completed, such a structure as shown in FIG. 11A wherein the PPS layer 4a and the PPS layer 4b are laminated alternately is obtained.

In this embodiment, the porous polysilicon layer of the laminated structure of the PPS layer 4a and the PPS layer 4b has a thickness of about 1 μm. While a part of the polysilicon layer 3 is made porous in this embodiment, alternatively the entire polysilicon layer 3 may be made porous.

Figure 11B:
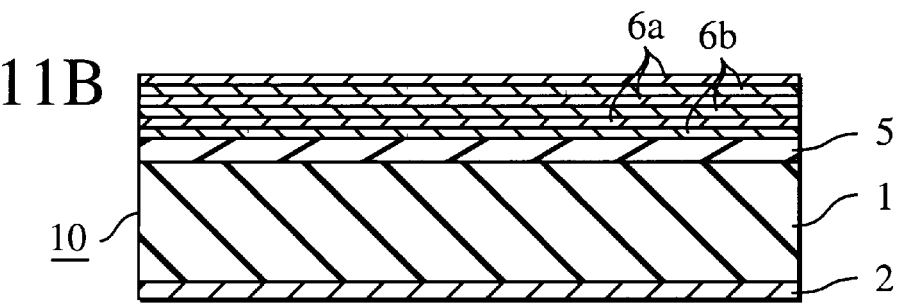

Then, through rapid thermal oxidation of all the PPS layers 4a, 4b and the polysilicon layer 3, a structure shown in FIG. 11B is obtained. Reference numeral 5 in FIG. 11B denotes the polysilicon layer processed by the rapid thermal oxidation. Reference numeral 6a and 6b denote the porous polysilicon layers processed by the rapid thermal oxidation (hereinafter referred to as RTO-PPS layers 6a and 6b). The rapid thermal oxidation process was conducted at an oxidation temperature of 900° C. for an oxidation period of one hour. In this embodiment, since the PPS layers 4a and 4b and the polysilicon layer 3 are oxidized by rapid thermal oxidation, the layers can be heated up to the oxidation temperature in several seconds, thus making it possible to suppress entrainment oxidation taking place when charging into a furnace in case the conventional oxidation apparatus of furnace tube type is used.

Figure 11C:
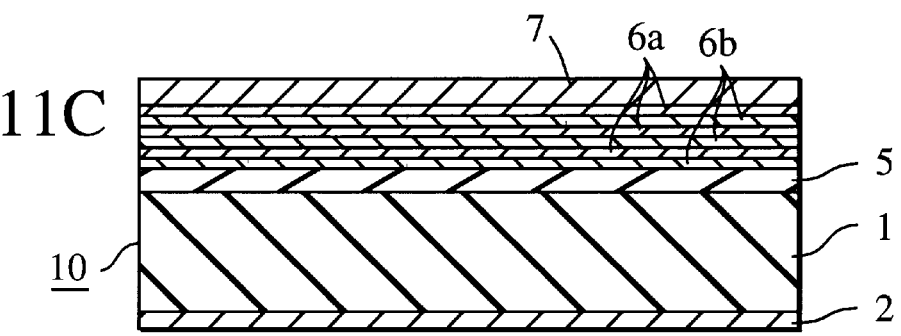

Then, a thin gold film 7 is formed on the RTO-PPS layers 6a and 6b by, for example, vapor deposition, thereby to obtain the field emission electron source 10 having a structure shown in FIG. 11C. While thickness of the thin gold film 7 is about 10 nm in this embodiment, the thickness is not limited to a particular value. The field emission electron source 10 forms a diode with the thin metal film 7 serving as a positive electrode (anode) and the ohmic electrode 2 serving as a negative electrode (cathode).

Now characteristics of the field emission electron source 10 of this embodiment will be described below.

The field emission electron source 10 is housed in a vacuum chamber (not shown) and a collector electrode 21 (collector for emitted electrons) is disposed at a position so as to confront the thin gold film 7 as shown in FIG. 3. Inside of the vacuum chamber is evacuated to a degree of about $5 \times 10^{-5}$ Pa. A DC voltage Vps is applied to the thin gold film 7 at the positive polarity with respect to the ohmic electrode 2 (i.e. the n-type silicon substrate 1), and a DC voltage Vc is applied to the collector electrode 21 at the positive polarity with respect to the thin gold film 7.

Figure 12:
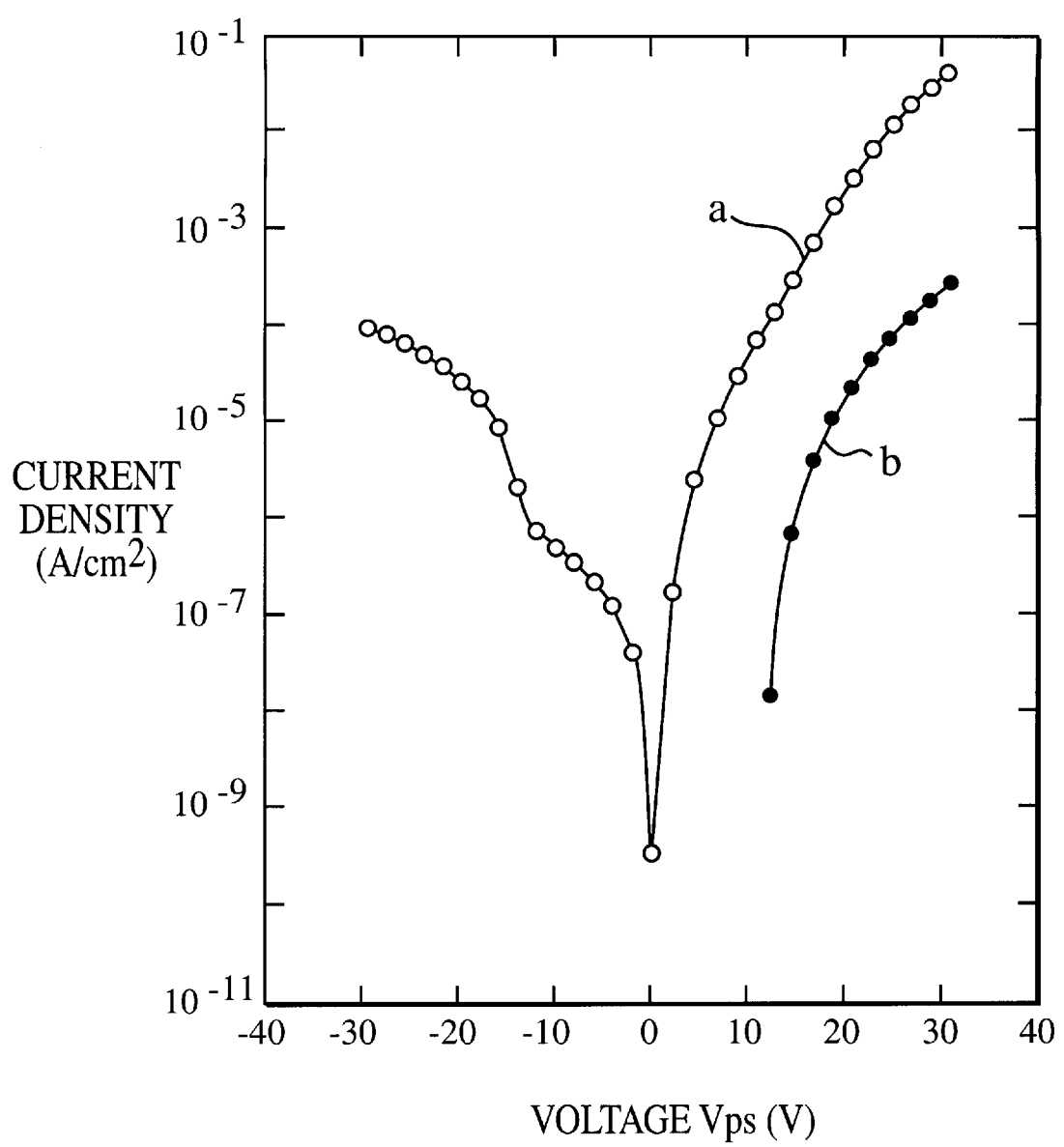
FIG. 12 shows a voltage-current characteristic of the second embodiment.

Measurements of diode current Ips flowing between the thin gold film 7 and the ohmic electrode 2, and electron emission current Ie flowing between the collector electrode 21 and the thin gold film 7 due to the emission of electrons e$^-$ from the field emission electron source 10 through the thin gold film 7 are shown in FIG. 12.

In FIG. 12, the DC voltage Vps is plotted along the horizontal axis and the current density is plotted along the vertical axis. Curve a in the drawing represents the diode current Ips and curve b represents the electron emission current Ie. The DC voltage Vc is set constant at 100 V.

As will be seen from FIG. 12, the electron emission current Ie was observed only when the DC voltage Vps was positive also in this embodiment similarly to the first embodiment, while both the diode current Ips and the electron emission current Ie were increased as the DC voltage Vps is increased. Specifically, when the DC voltage Vps was 15 V, the current density of the diode current Ips was about 1 mA/cm$^2$ and the current density of the electron emission current Ie was about 4 μA/cm$^2$. This value of the electron emission current Ie is much greater than that obtained with the previously described conventional field emission electron source, indicating a high efficiency of electron emission exhibited by the field emission electron source of this embodiment.

Figure 13:
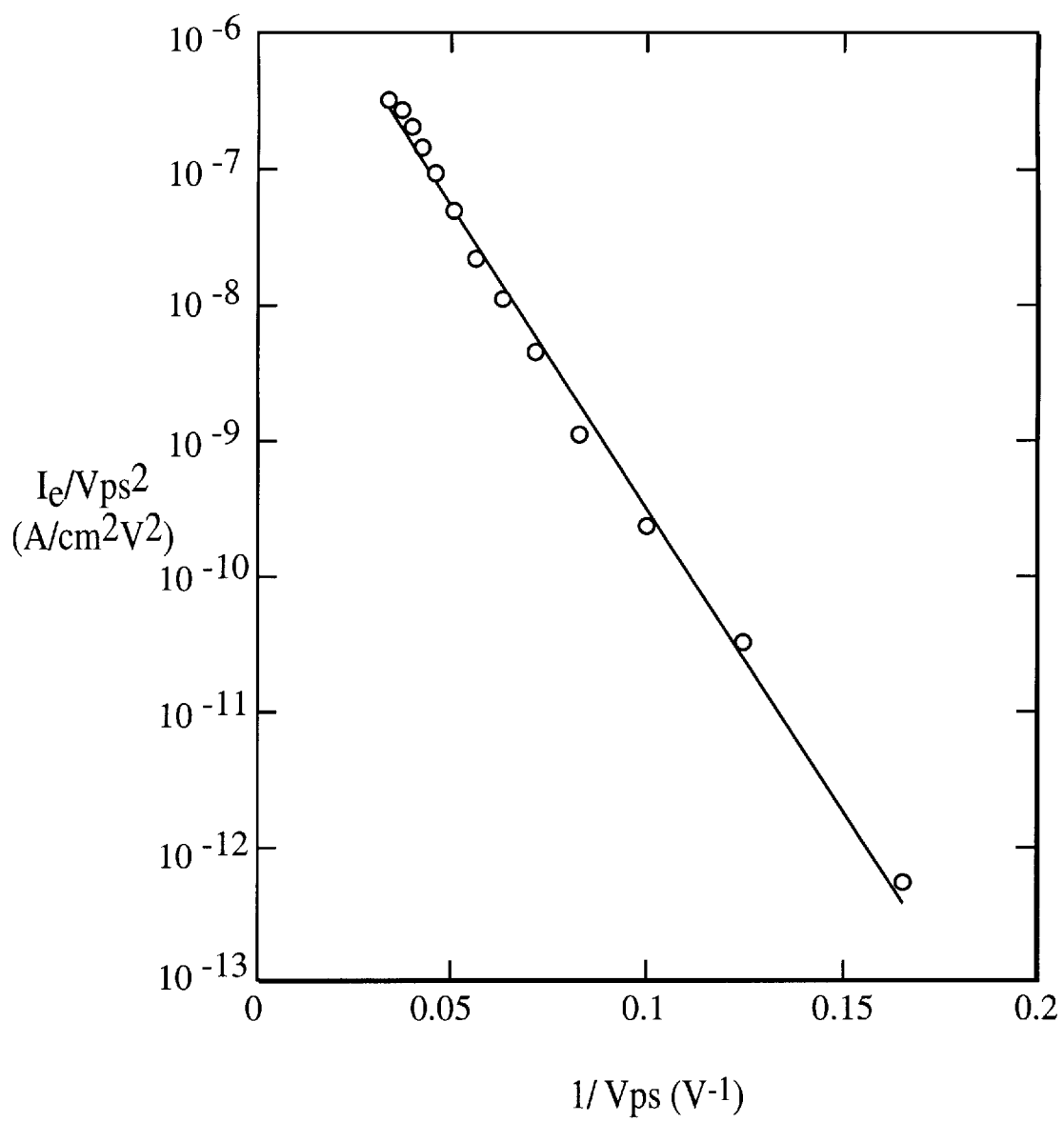
FIG. 13 is a graph of Fowler-Nordheim plot of the data of the second embodiment.

FIG. 13 shows Fowler-Nordheim plots of the electron emission current Ie versus the DC voltage Vps. The fact that the plots lie on a straight line in FIG. 13 indicates that the electron emission current Ie caused by the emission of electrons is due to the well-known quantum tunneling effect, as is the case with the first embodiment.

Figure 14:
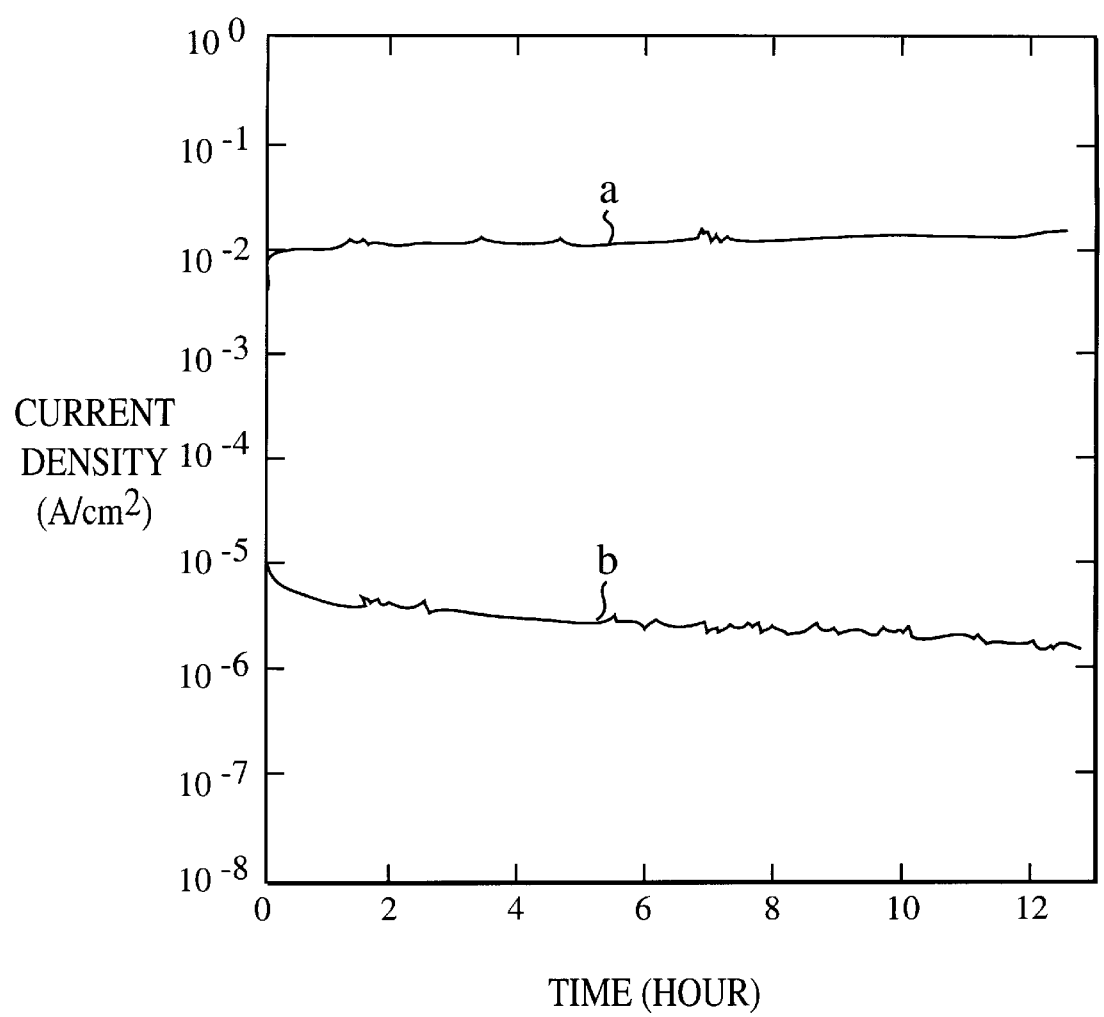
FIG. 14 is a graph showing a change in current with time of the second embodiment.

FIG. 14 is a graph showing the diode current Ips and the electron emission current Ie of the field emission electron source 10 of this embodiment with change in time. Time is plotted along the horizontal axis and the current density is plotted along the vertical axis, while curve a in the drawing shows the diode current Ips and curve b shows the electron emission current Ie.

Shown in FIG. 14 is the result obtained by setting the DC voltage Vps constant at 21 V and the DC voltage Vc constant at 100 V. As will be seen from FIG. 14, the popping phenomenon is not observed in both the diode current Ips and the electron emission current Ie in the case of the field emission electron source 10 of this embodiment, similarly to the first embodiment, so that the diode current Ips and the electron emission current Ie can be maintained substantially constant with time. Such a characteristic of stable electron emission current Ie with less chronic change achieved by employing the configuration of the present invention cannot be achieved with the conventional field emission electron source based on the MIM system or single-crystal silicon substrate of which surface is made porous.

Figure 15:
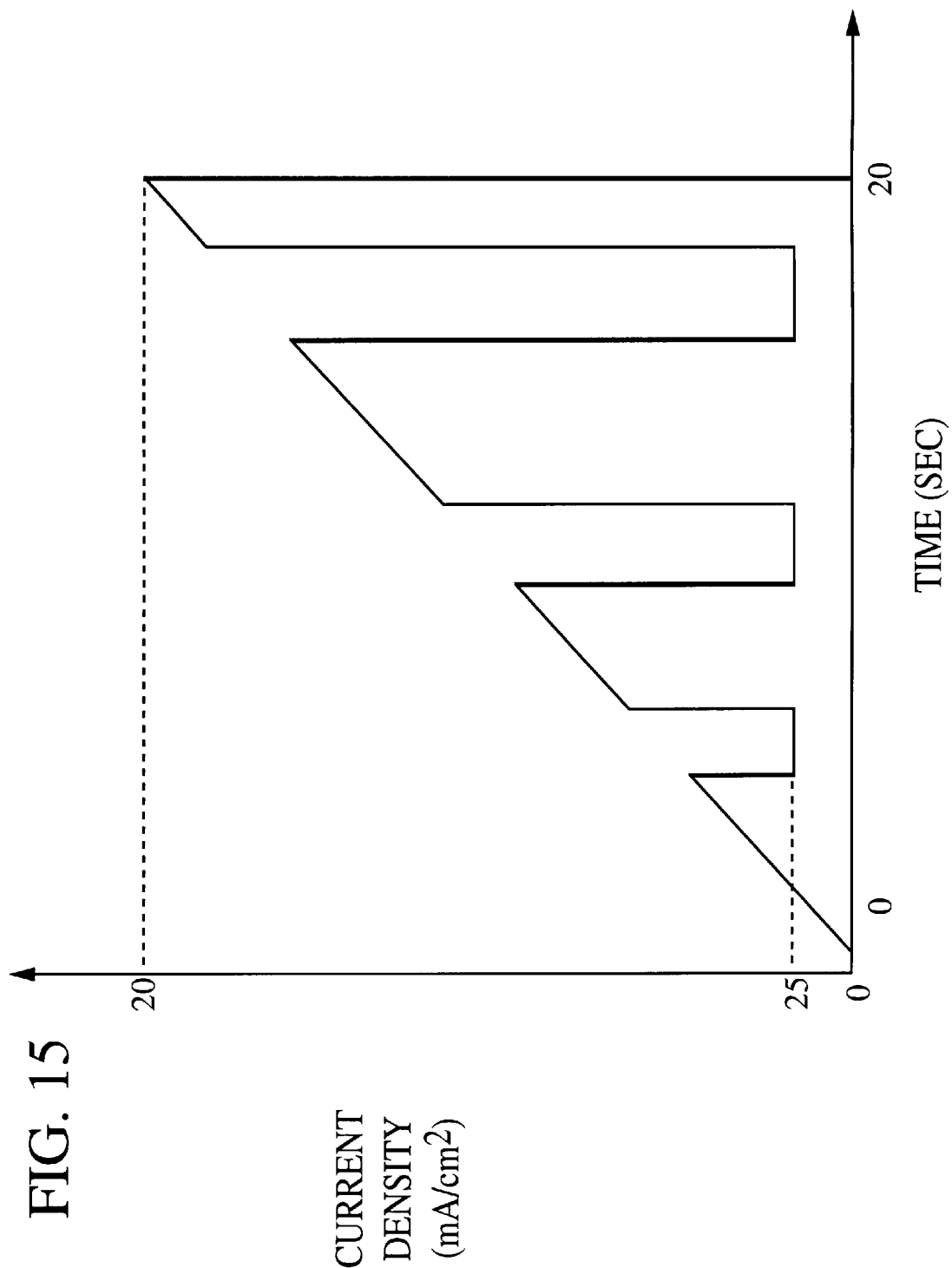
FIG. 15 shows an anodization process for another example of the second embodiment.

The anodization process may also be carried out as follows. As shown in FIG. 15, after starting the anodization process with the current density set to 0 mA/cm$^2$, the current density is increased from 0 mA/cm$^2$ to 20 mA/cm$^2$ in 20 seconds, during which current density is kept at 2.5 mA/cm$^2$ for two seconds three times. As a matter of course, the surface is irradiated with light by means of a 500 W tungsten lamp during the anodization process. In this case, the porous polysilicon layer 4a having low porosity is formed in the period when the current density is set to 2.5 mA/cm$^2$.

(Third Embodiment)

The basic configuration of the field emission electron source 10 of the third embodiment is substantially similar to that of the first embodiment shown in FIG. 1, and therefore, only the production method will be described below with reference to FIGS. 16A to 16C. In describing the production method, only the difference from the first embodiment are described for the sake of brevity. While the porous polysilicon layer is a single layer having a uniform porosity in the first embodiment, the porous polysilicon layer 6 in the third embodiment is a layer whose porosity changes continuously in the direction of thickness so that the porosity is higher on the side of the electrically conductive substrate than on the front surface side thereof. This embodiment also uses the n-type silicon substrate 1 ((100) substrate having a resistivity of about 0.1 Ωcm) for the electrically conductive substrate as is the case with that in the first embodiment.

Figure 16A:
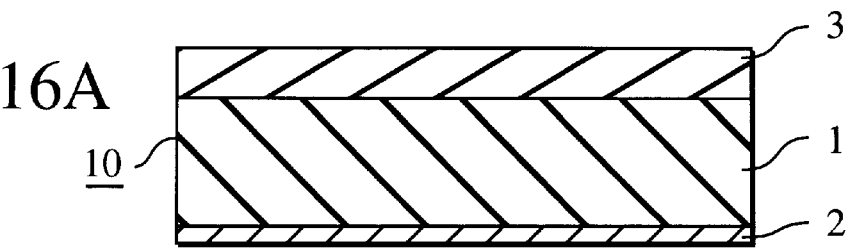
FIGS. 16A to 16C are cross sectional views showing major steps for explaining the production process of a third embodiment.
Figure 16B:
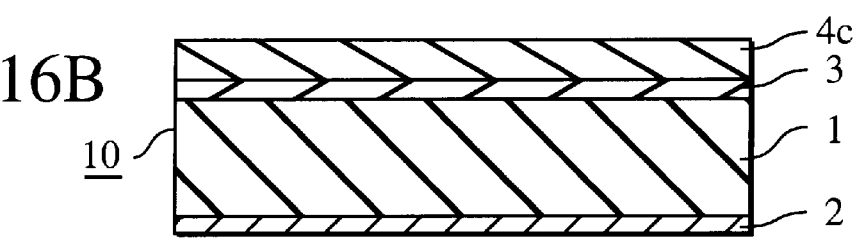

First, the ohmic electrode 2 is formed on the back surface of the n-type silicon substrate 1, and then the undoped polysilicon layer 3 of about 1.5 μm in thickness is formed on the front surface of the n-type silicon substrate 1, thereby to obtain the structure as shown in FIG. 16A.

Then the polysilicon layer 3 is subjected to anodization with a constant current while being irradiated with light, by using a liquid electrolyte made by mixing a 55 wt % aqueous solution of hydrogen fluoride and ethanol with a proportion of about 1:1, a platinum electrode (not shown) as the negative electrode and the n-type silicon substrate 1 (ohmic electrode 2) as the positive electrode. The anodization process was conducted in the following conditions: the anodization was started with a constant current density of 0 mA/cm$^2$, then the current density was increased from 0 mA/cm$^2$ continuously (gradually) to 20 mA/cm$^2$. The surface was irradiated with light by means of a 500 W tungsten lamp during the anodization process. At the time when the anodization is completed, a porous polysilicon layer 4c having the porosity increasing continuously from the front surface toward the n-type silicon substrate 1 (hereinafter referred to as PPS layer 4c) is formed, resulting in such a structure as shown in FIG. 16B. In this embodiment, the PPS layer 4c has a thickness of about 1 μm. While a part of the polysilicon layer 3 is made porous in this embodiment, alternatively the entire polysilicon layer 3 may be made porous.

Figure 16C:
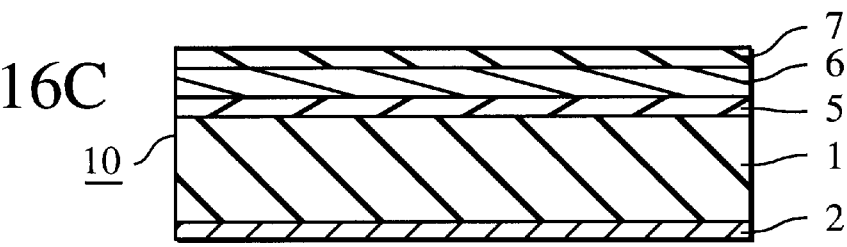

Then through rapid thermal oxidation of the PPS layer 4c and the polysilicon layer 3 (under conditions of an oxidation temperature of 900° C. and an oxidation period of one hour) and formation of the thin gold film 7, the field emission electron source 10 of the structure shown in FIG. 16C is obtained. While the thickness of the thin gold film 7 is about 10 nm in this embodiment, the thickness is not limited to such particular value. The field emission electron source 10 forms a diode with the thin metal film 7 serving as a positive electrode (anode) and the ohmic electrode 2 serving as a negative electrode (cathode). Reference numeral 5 in FIG. 16C denotes the polysilicon layer which has been subjected to rapid thermal oxidation and Reference numeral 6 denotes the PPS layer 4c (RTO-PPS layer 6) which has been subjected to rapid thermal oxidation.

While the porosity is changed by gradually increasing the current density during the anodization process in this embodiment, the porosity may also be changed by gradually decreasing the current density, in which case the porosity becomes lower near the n-type silicon substrate 1 and higher near the front surface.

(Fourth Embodiment)

Figure 17:
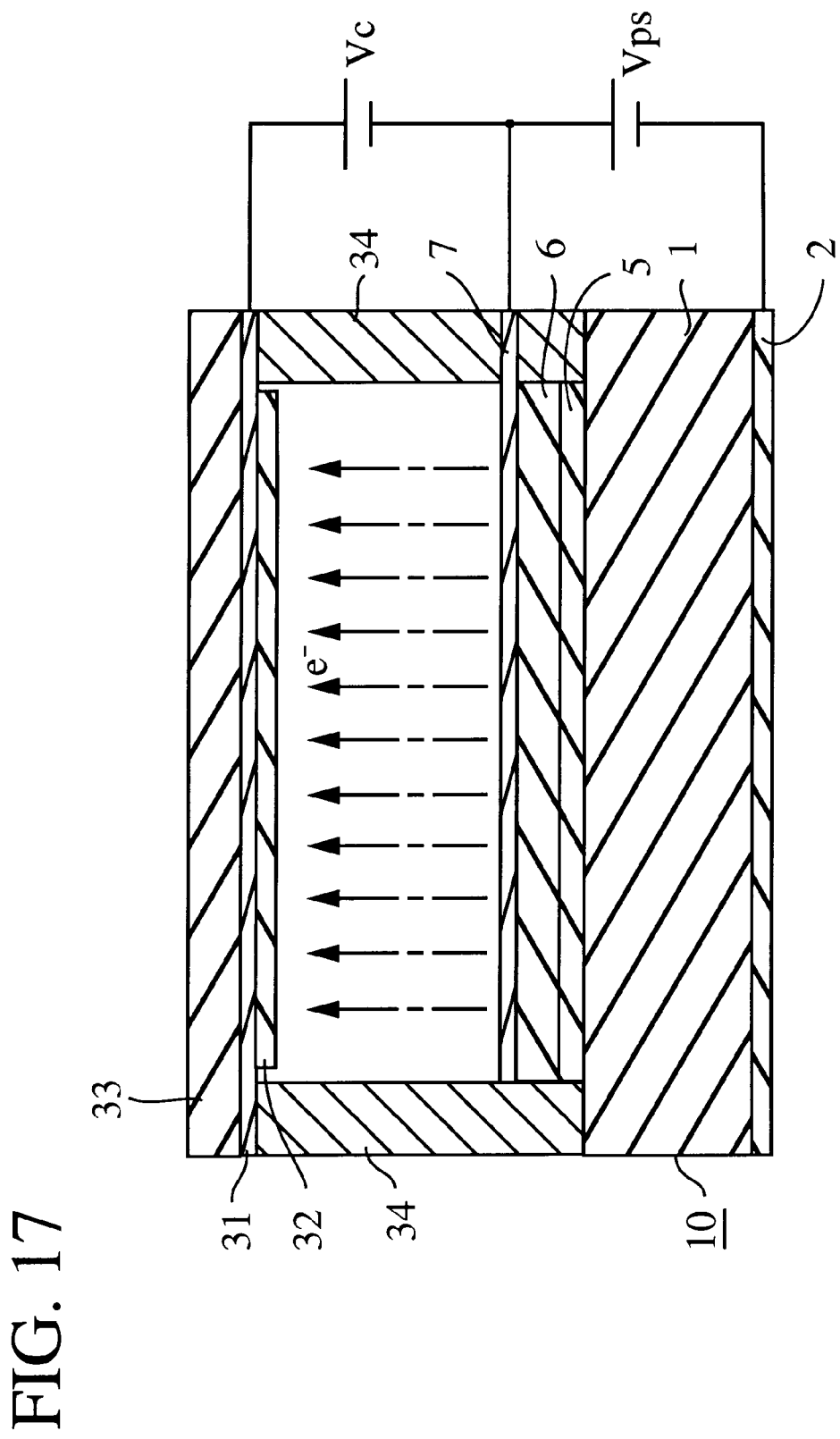
FIG. 17 is a schematic diagram showing a configuration of a planar light emitting apparatus in a fourth embodiment.

FIG. 17 is a schematic diagram showing the configuration of a planar light emitting apparatus using the field emission electron source 10 of any one of the first to third embodiments. Components similar to those of the first embodiment (or the third embodiment) will be denoted with the same reference numerals and the description thereof will be omitted.

The planar light emitting apparatus of this embodiment has the field emission electron source 10 and a transparent electrode 31 disposed so as to confront the thin gold film 7 of the field emission electron source 10, with the transparent electrode 31 being coated with a fluorescent substance 32 which emits visible light when irradiated with electron beam emitted by the field emission electron source 10. The transparent electrode 31 is formed by coating on a transparent plate 33 such as a glass substrate. The transparent plate 33 having the transparent electrode 31 and the fluorescent substance 32 both formed thereon is held together with the field emission electron source 10 via a spacer 34 into an integral structure, with the inner space surrounded by the transparent plate 33, the spacer 34 and the field emission electron source 10 is evacuated to a predetermined degree of vacuum. Therefore, the fluorescent substance can emit light when irradiated with electrons emitted by the field emission electron source 10, and the light so emitted by the fluorescent substance 32 is transmitted to the outside through the transparent electrode 31 and the transparent plate 33.

In the planar light emitting apparatus of this embodiment, when a DC voltage Vc of 1 kV was applied between the transparent electrode 31 and the thin metal film 7 with the transparent electrode 31 at the positive polarity with respect to the thin metal film 7, and the DC voltage Vps of about 15 V was applied between the thin gold film 7 of the field emission election source 10 and the ohmic electrode 2 to emit electrons, then a fluorescence pattern corresponding to the area (size) of the thin gold film 7 was obtained This means that the electron emission current density generated by the field emission electron source 10 is substantially uniform within the surface of the thin gold film 7, and that electrons e$^-$ are emitted at right angles to the thin gold film 7, indicating that the electrons e$^-$ follow substantially parallel trajectories without expansion or contraction of the electron ray. Thus because the electrons e$^-$ are emitted substantially at right angles to the thin gold film 7 and substantially uniform within the surface thereof in this embodiment, it is not necessary to install a convergence electrode used in the conventional planar light emitting apparatus disclosed in "IEEE TRANSACTIONS ON ELECTRON DEVICES, vol. 38, no. 10, OCTOBER 1991 pp 2355–2363", making it possible to simplify the construction and reduce the cost. Further, no popping phenomenon occurs during electron emission from the field emission electron source 10 thereby reducing unevenness in the light.

(Fifth Embodiment)

Figure 18:
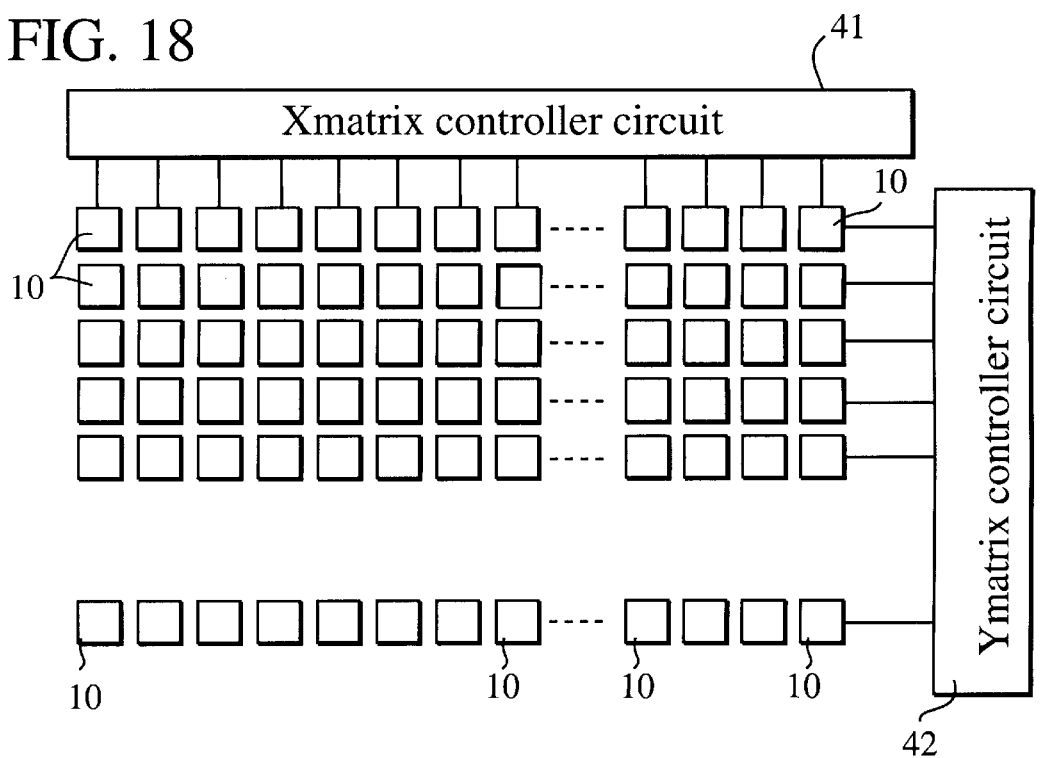
FIG. 18 is a schematic diagram showing a configuration a display apparatus in a fifth embodiment.

FIG. 18 is a schematic diagram showing the configuration of the electron source when the field emission electron source 10 of any one of the first to third embodiments is applied to a display apparatus. In this embodiment, as shown in FIG. 18, a plurality of the field emission electron sources 10 are arrayed in a matrix configuration, with each field emission electron source 10 corresponding to a pixel. The DC voltage Vps described in conjunction with the first embodiment and applied to the field emission electron source 10 is controlled by an X matrix controller circuit 41 and a Y matrix controller circuit 42. In other words, each field emission electron source 10 which should have the DC voltage Vps applied thereto is selected by the X matrix controller circuit 41 and the Y matrix controller circuit 42, and electrons are emitted only from the selected field emission electron source 10.

The display apparatus of this embodiment has a transparent electrode disposed so as to confront the electron source, that is, so as to confront the thin gold film 7 of the field emission electron source 10 in a manner similar to that in the fourth embodiment although not shown in the drawing. The transparent electrode is coated with a fluorescent substance which emits visible light when irradiated with the electron beam emitted by the field emission electron source 10. The transparent electrode is formed by coating indium tin oxide (ITO) on a transparent plate such as glass substrate.

The electrons emitted by each field emission electron source 10 emerge from the thin gold film 7 substantially at right angles to the thin gold film 7 and substantially uniform within the surface thereof so that the electron rays are substantially parallel. The display apparatus of this embodiment is capable of causing only a portion of the fluorescent substance which opposes the field emission electron source 10 to emit light. Therefore, a high definition display apparatus can be made without need to install a complicated shadow mask unlike the prior art.

(Sixth Embodiment)

Figure 19:
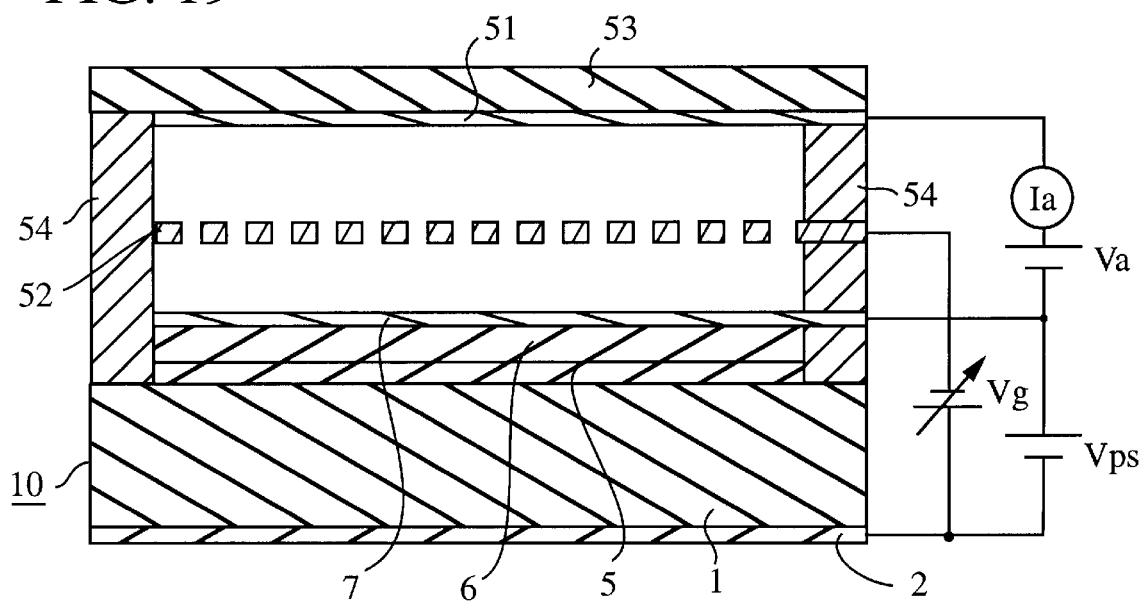
FIG. 19 is a schematic diagram showing a configuration of a solid vacuum device in a sixth embodiment.

FIG. 19 is a schematic diagram showing the configuration of a solid vacuum device which uses the field emission electron source 10 of any one of the first to third embodiments. Components similar to those of the first or third embodiment will be denoted with the same reference numerals and description thereof will be omitted.

The solid vacuum device of this embodiment is of a triode type wherein the field emission electron source 10 serves as a cathode, an anode 51 (positive electrode) is disposed to oppose the thin gold film 7 of the field emission electron source 10, and a meshed grid 52 is installed between the anode 51 and the cathode. The anode 51, the grid 52 and the cathode are sealed in vacuum atmosphere by means of sealers 53, 54. In this embodiment, the sealers 53, 54 and an electrically conductive substrate consisting of the n-type silicon substrate 1 constitute a vacuum chamber.

In the solid vacuum device of this embodiment, electrons are emitted from the field emission electron source, that is, the cathode, when the DC voltage Vps is applied to the field emission electron source 10, and the electrons are accelerated by anode voltage Va applied between the anode 51 and the thin gold film 7, so that the anode current Ia flows between the anode 51 and the cathode. The magnitude of the anode current Ia can be controlled by adjusting the value of DC voltage Vg applied between the grid 52 as a negative electrode and the ohmic electrode 2.

While the vacuum devices of the prior art usually utilize a cathode based on thermionic electron emission, a solid vacuum device based on cold cathode having a long service life can be achieved by using the field emission electron source of the present invention.

Although this embodiment is described in connection with the solid vacuum device of triode type, the present invention can also be applied to a multielectrode type.

Although the present invention has been fully described in connection with the preferred embodiments thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A field emission electron source comprising:
   an electrically conductive substrate;
   an oxidized or nitrided porous polysilicon layer formed on the surface of the electrically conductive substrate on one side thereof and having nanostructures; and
   a thin metal film formed on the oxidized or nitrided porous polysilicon layer, wherein when a voltage is applied to said thin metal film used as a positive electrode with respect to said electrically conductive substrate an electron beam is emitted through said thin metal film.

2. The field emission electron source according to claim 1, wherein said porous polysilicon layer is a polysilicon layer that makes said field emission electron source have substantially no popping phenomenon when voltage is applied to said thin metal film used as a positive electrode with respect to said electrically conductive substrate thereby to emit electron beam through said thin metal film.

3. The field emission electron source according to claim 1, wherein said porous polysilicon layer is made by alternately laminating a polysilicon layer having high porosity and a polysilicon layer having low porosity.

4. The field emission electron source according to claim 1, wherein said porous polysilicon layer is a layer whose porosity changes continuously in the direction of thickness.

5. The field emission electron source according to claim 1, wherein said porous polysilicon layer is a layer whose porosity changes continuously in a direction of thickness so that said porosity is higher on a side of the electrically conductive substrate than on a front surface side.

6. The field emission electron source according to claim 1, wherein said polysilicon layer is an undoped polysilicon layer.

7. The field emission electron source according to claim 1, wherein said electrically conductive substrate comprises a substrate such as glass, and an electrically conductive thin film formed on a surface of the transparent substrate.

8. The field emission source of claim 1, further comprising a transparent electrode opposing said thin metal film.

9. The field emission source of claim 1, wherein the nanostructures are smaller than approximately 50 nm.

10. The field emission source of claim 1, wherein the nanostructures are smaller than approximately 10 nm.

11. The field emission source of claim 1, wherein the nanostructures are smaller than approximately 5 nm.

12. A method of producing a field emission electron source which comprises:
    forming a polysilicon layer on an electrically conductive substrate;
    making said polysilicon layer porous;
    oxidizing or nitriding said porous polysilicon layer; and
    forming an electrode made of a thin metal film on the oxidized or nitrided porous polysilicon layer.

13. The method of producing the field emission electron source according to claim 12, wherein said making said polysilicon layer porous is making said polysilicon layer porous so that a polysilicon layer having high porosity and a polysilicon layer having low porosity are laminated alternately.

14. The method of producing the field emission electron source according to claim 12, wherein said making said polysilicon layer porous is making said polysilicon layer porous so that the porosity is higher on the side of the electrically conductive substrate than on the front surface side and porosity changes continuously in the direction of thickness.

15. A planar light emitting apparatus comprising:
    a field emission electron source comprising an electrically conductive substrate, an oxidized or nitrided porous polysilicon layer formed on the surface of said electrically conductive substrate on one side thereof and having nano-structures and a thin metal film formed on said oxidized or nitrided porous polysilicon layer; and a transparent electrode disposed to oppose said thin metal film, wherein said transparent electrode has a fluorescent substance which emits visible light when irradiated with electron beam being provided thereon.

16. The apparatus of claim 15, wherein said porous polysilicon layer makes said field emission electron source have substantially no popping phenomenon when voltage is applied to said thin metal film used as a positive electrode with respect to said electrically conductive substrate thereby to emit electron beam through said thin metal film.

17. The apparatus of claim 15, wherein said porous polysilicon layer is made by alternately laminating polysilicon layer having high porosity and polysilicon layer having low porosity.

18. The apparatus of claim 15, wherein said porous polysilicon layer is a layer whose porosity changes continuously in the direction of thickness.

19. The apparatus of claim 15, wherein said porous polysilicon layer is a layer whose porosity changes continuously in the direction of thickness so that said porosity is higher on a side of the electrically conductive substrate than on a front surface side.

20. The apparatus of claim 15, wherein said porous polysilicon layer is undoped.

21. The apparatus of claim 15, wherein said electrically conductive substrate comprises a transparent substrate and an electrically conductive thin film formed on the transparent substrate.

22. A display apparatus comprising:
field emission electron sources comprising an electrically conductive substrate, an oxidized or nitrided porous polysilicon layer formed on the surface of said electrically conductive substrate on one side thereof and having nano-structures and a thin metal film formed on said oxidized or nitrided porous polysilicon layer, wherein said field emission electron sources are formed in matrix configuration;
a controller for controlling voltages applied to said field emission electron sources; and
a transparent electrode disposed to oppose said thin metal film, wherein said transparent electrode has a fluorescent substance which emits visible light when irradiated with electron beam being provided thereon.

23. The apparatus of claim 22, wherein said porous polysilicon layer makes said field emission electron source have substantially no popping phenomenon when voltage is applied to said thin metal film used as a positive electrode with respect to said electrically conductive substrate thereby to emit electron beam through said thin metal film.

24. The apparatus of claim 22, wherein said porous polysilicon layer is made by alternately laminating polysilicon layer having high porosity and polysilicon layer having low porosity.

25. The apparatus of claim 22, wherein said porous polysilicon layer is a layer whose porosity changes continuously in the direction of thickness.

26. The apparatus of claim 22, wherein said porous polysilicon layer is a layer whose porosity changes continuously in the direction of thickness so that said porosity is higher on a side of the electrically conductive substrate than on a front surface side.

27. The apparatus of claim 22, wherein said porous polysilicon layer is undoped.

28. The apparatus of claim 22, wherein said electrically conductive substrate comprises a transparent substrate and an electrically conductive thin film formed on the transparent substrate.

29. A solid vacuum device comprising:
a field emission electron source comprising an electrically conductive substrate, an oxidized or nitrided porous polysilicon layer formed on the surface of said electrically conductive substrate on one side thereof and having nano-structures and a thin metal film formed on said oxidized or nitrided porous polysilicon layer;
a positive electrode; and
a vacuum chamber, wherein both said field emission electron source and said positive electrode are disposed in said vacuum chamber.

30. The device of claim 29, wherein said porous polysilicon layer makes said field emission electron source have substantially no popping phenomenon when voltage is applied to said thin metal film used as a positive electrode with respect to said electrically conductive substrate thereby to emit electron beam through said thin metal film.

31. The device of claim 29, wherein said porous polysilicon layer is made by alternately laminating polysilicon layer having high porosity and polysilicon layer having low porosity.

32. The device of claim 29, wherein said porous polysilicon layer is a layer whose porosity changes continuously in the direction of thickness.

33. The device of claim 29, wherein said porous polysilicon layer is a layer whose porosity changes continuously in the direction of thickness so that said porosity is higher on a side of the electrically conductive substrate than on a front surface side.

34. The device of claim 29, wherein said porous polysilicon layer is undoped.

35. The device of claim 29, wherein said electrically conductive substrate comprises a transparent substrate and an electrically conductive thin film formed on the transparent substrate.

* * * * *